(12) United States Patent
Kong et al.

(10) Patent No.: US 9,171,278 B1
(45) Date of Patent: Oct. 27, 2015

(54) ITEM ILLUMINATION BASED ON IMAGE RECOGNITION

(71) Applicant: Amazon Technologies, Inc., Reno, NV (US)

(72) Inventors: Cheuk-Man Kong, Toronto (CA); Mohan Krishna Rao, Mississauga (CA); Morley Duncan Abbott, Toronto (CA); Balasubramaneyam Maniymaran, Scarborough (CA)

(73) Assignee: Amazon Technologies, Inc., Reno, NV (US)

( * ) Notice: Subject to any disclaimer, the term of this patent is extended or adjusted under 35 U.S.C. 154(b) by 106 days.

(21) Appl. No.: 14/036,657

(22) Filed: Sep. 25, 2013

(51) Int. Cl.
*G06F 7/00* (2006.01)
*G06Q 10/08* (2012.01)
*B65G 1/137* (2006.01)

(52) U.S. Cl.
CPC .............. *G06Q 10/087* (2013.01); *B65G 1/137* (2013.01)

(58) Field of Classification Search
CPC ...... G06Q 10/087; G06Q 10/08; A61J 7/0084
USPC ........................................................ 700/216
See application file for complete search history.

(56) References Cited

U.S. PATENT DOCUMENTS

| | | | |
|---|---|---|---|
| 5,963,134 A | 10/1999 | Bowers et al. | |
| 5,970,471 A | 10/1999 | Hill | |
| 6,154,771 A | 11/2000 | Rangan et al. | |
| 6,273,338 B1 | 8/2001 | White | |
| 6,541,100 B1 | 4/2003 | Williams et al. | |
| 6,566,024 B1 | 5/2003 | Bourdelais et al. | |
| 6,969,092 B2 | 11/2005 | Macwilliams et al. | |
| 2002/0194051 A1 | 12/2002 | Hall et al. | |
| 2003/0004816 A1 | 1/2003 | Byers, Jr. et al. | |
| 2003/0009392 A1 | 1/2003 | Perkowski | |
| 2008/0183328 A1* | 7/2008 | Danelski | 700/216 |
| 2014/0139654 A1* | 5/2014 | Takahashi | 348/61 |

OTHER PUBLICATIONS

"Book Collector Book Inventory Software," Collectorz.com Book Collector, n. d., <http://www.collectorz.com/book/book_inventory.php?from=google&keyword=book_inv . . . > [retrieved Dec. 31, 2003]. pp. 1-2.
"Book Collector Features," Collectorz.com Book Collector, n.d., <http://www.collectorz.com/book/features.php> [retrieved Dec. 31, 2003]. pp. 1-2.

(Continued)

*Primary Examiner* — Klye Logan
(74) *Attorney, Agent, or Firm* — Robert C. Kowert; Meyertons, Hood, Kivlin, Kowert & Goetzel, P.C.

(57) ABSTRACT

An inventory item to be picked may be selected along with an inventory location (e.g., storage bin) storing a particular unit of the item among a units of heterogeneous items also stowed in the inventory location. One or more images of the inventory location may be obtained and analyzed to determine a position of the unit of the item. Instructions may be sent to direct a device to illuminate the determined position of the unit of the item, and pick instructions may be sent to the same or a different the device. A device may receive the position instructions from a control system, and illuminate the determined position of the unit of the item within the inventory location. The pick instructions may direct an agent or mobile storage bin to a particular location and direct the agent to pick the unit of the item from the illuminated position.

16 Claims, 12 Drawing Sheets

(56) References Cited

OTHER PUBLICATIONS

"Edge, Junction, and Corner Detection Using Color Distributions," ACM Portal, ACM, Inc. © 2004, <http://portal.acm.org/citation.cfm?id=505477&dl=ACM&coll=portal> [retrieved Feb. 24, 2004]. pp. 1-7.

"Technology and Services," Advanced Records Management Services, Inc., n.d., <http://www.armsrecords.com/pg4.html> [retrieved Dec. 31, 2003]. pp. 1-3.

"Visual Inventory Control Software," Dynamic Control Software, n.d. <http://www.dynamiccontrolsoftware.com> [retrieved Dec. 31, 2003]. pp. 1-3.

Feder, A., "A Look at Delicious Library 3.0 (images)," Think Secret, Aug. 3, 2004, <http://thinksecret.com/news/deliciouslibrary.html> [retrieved Jan. 19, 2005]. pp. 1-4.

"A Look at Delicious Library 3.0 Overview," Think Secret, Aug. 3, 2004, <http://thinksecret.com/archives/images/deliciouslibrary/Overview.html> [retrieved Jan. 19, 2005]. p. 1.

"Visual Inventory Control," Dynamic Control Software, <http://dynamiccontrolsoftware.com>, publicly available prior to Jun. 9, 2004, [retrieved Jan. 19, 2005]. pp. 1-2.

U.S. Appl. No. 10/864,291, filed Jun. 9, 2004, Lawrence Tesler et al.

U.S. Appl. No. 13/875,769, filed May 2, 2013, Lawrence Tesler et al.

* cited by examiner

ITEM ILLUMINATION BASED ON IMAGE RECOGNITION

BACKGROUND

Retailers, wholesalers, and other product distributors (which may collectively be referred to as distributors) typically maintain an inventory of various items that may be ordered by clients or customers. Similarly, manufacturers may maintain an inventory of parts and/or materials for use in manufacturing processes. This inventory may be maintained and processed at a materials handling facility which may include, but is not limited to, one or more of: warehouses, distribution centers, cross-docking facilities, order fulfillment facilities, packaging facilities, shipping facilities, or other facilities or combinations of facilities for performing one or more functions of material (inventory) handling.

When a customer places an order, one or several inventory items specified in the order must be retrieved or "picked" from inventory and prepared for delivery to the customer. Traditionally, like items are stored together within inventory to facilitate inventory tracking and management. For example, items having a common Universal Product Code (UPC), Stock-Keeping Unit (SKU) code, or other designation (including proprietary designations) may be stored together within inventory. In an inventory environment that includes a large number of many different items, it may be highly inefficient for a single employee to physically locate and pick every item for a given order. For example, different items specified in a given order may be stored at mutually remote locations within the inventory facility, which would require a single picking agent to traverse a long path through the facility.

In order to make better use of inventory stocking space, it may be desirable to stock different items together in a single storage location or stocking area. While increasing the efficient use of inventory space, such co-location of different items may increase the difficulty, and thus the time, of identifying and picking a particular item. When picking items from inventory, the picking agent may generally need to examine some number of co-located items in order to determine the specific item to pick. This can be time consuming in situations where numerous similar items are stored together. Additionally, several similarly titled or described items may be stored in a single inventory area, increasing the difficulty of identifying any particular item. For instance, if several CDs are entitled "Greatest Hits" and stored together, a picking agent may have to read the full title for each item in turn to identify the correct item. The extra time this requires may be significant when multiplied across the large number of orders fulfilled by a typical facility. Similarly, in a facility handling items for rent or sale, there may be a large number of similar-looking items, such as DVDs, stored together. A picking agent may have difficulty identifying particular DVDs from among multiple DVDs in a single inventory. Again, any extra time required to correctly identify a DVD becomes significant, since each DVD may be stored and picked many times, as it is rented and returned.

Furthermore, items may be stored in packaging, such as shipping boxes, made of cardboard for example, that may not readily indicate what is contained in the packaging to a picking agent. For example, various large televisions may each be stored in packaging specifically designed to protect the television (and the television's retail product packaging as well) from damage while in transit and while being stored. This protective packaging may be comprised of plain cardboard packaging and the like that does not readily indicate the particular model, color, size or other identifying information that would be helpful to a picker in distinguishing the item from other televisions stored in the same area. While some protective packaging may indicate the manufacturer for example, the picker and facility may rely upon bar codes and the like which may require time-consuming scanning to particularly identify which of the many particular items of the manufacturer is contained within the shipping box. In other instances, product packaging for similar items may not readily identify the differences between the similar items, leading to confusion and mistakes during picking. While a picker may have an idea of what the item to be picked looks like, the plain packaging of shipping boxes and the like may prevent perception of the item by the picker because the picker is not familiar with the shipment packaging or because shipping packaging tends to look similar across multiple items, for example.

Some materials handling facilities include a pick-to-light system, in which lights mounted on shelves or racks in inventory are programmed to light up to indicate a bin or other storage area in which items having a given product identifier are stored. Such systems may include support for put-to-light operations, as well (e.g., lighting up a container in which items should be stored). However, such systems may not be suitable for use in facilities that store different items together in a single inventory area, or in facilities in which agents traverse multiple inventory areas during picking and stowing operations, or in facilities in which mobile drive units bring storage bins of inventory to the picker/stower at a station. Also, such technologies only identify an inventory location or bin generally, not individual positions or items within the inventory locating.

Various materials handling facilities include a laser-pointer system, in which a laser is mounted to a stationary position and is calibrated to point to a single, pre-determined position for each inventory location (e.g., storage bin) to indicate the entire inventory location. Such technologies do not identify the location of the item based on images of the item and do not identify the particular position of the unit of the item within the inventory location from a plurality of possible positions within the inventory location.

Figure 1:
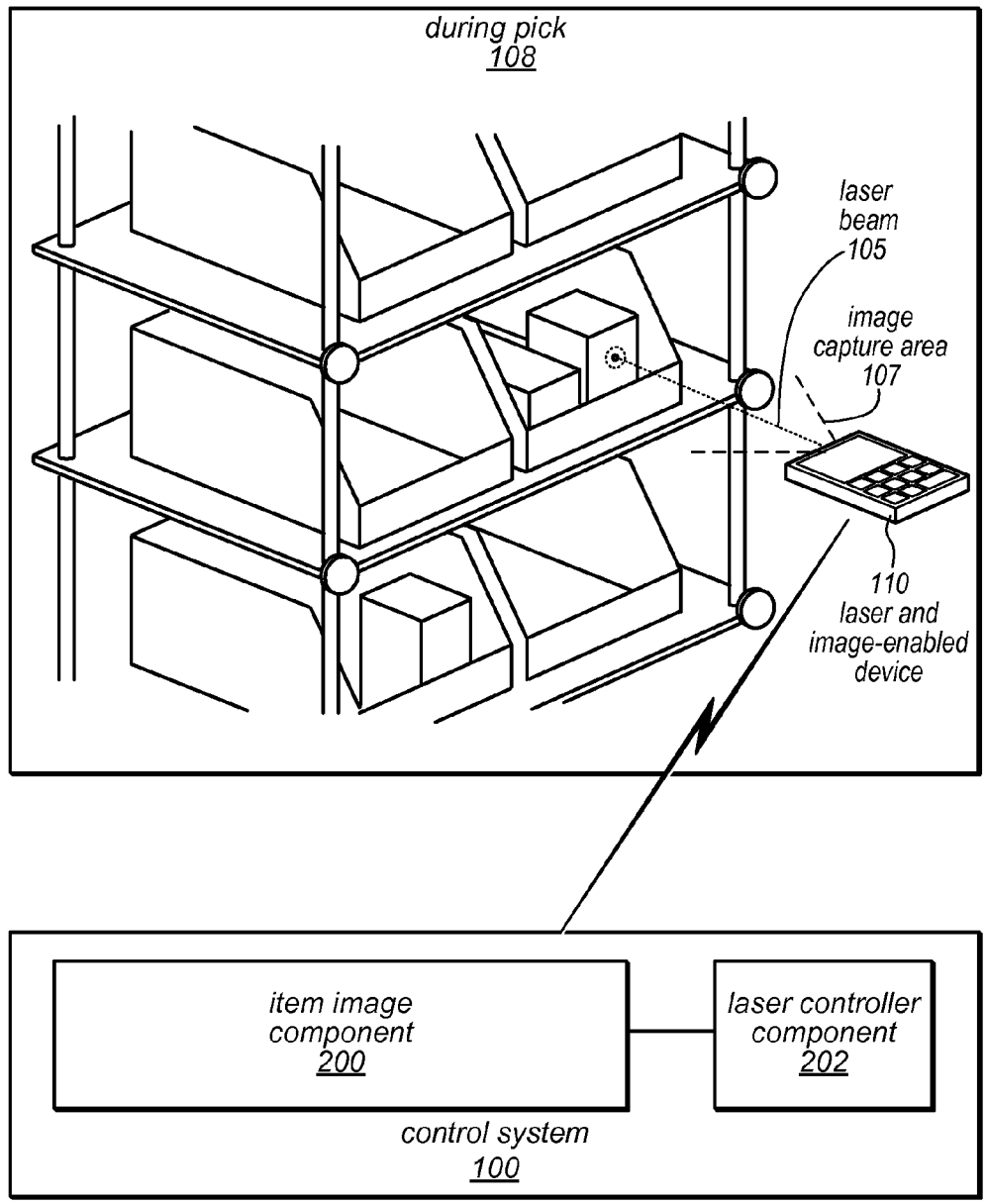
FIG. 1 illustrates an implementation of a process to illuminate a particular position of a unit of an item in an inventory location during a picking process for the unit of the item, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In a materials handling facility, multiple, different product items may be stored together in a single inventory area, such as a shelf, rack, bin, or drawer. For example, a facility may store items such as books, CDs, DVDs, electronic devices, clothing, toys, hardware, materials, and/or other items together in various combinations within each inventory area. Items may be stored in inventory areas by an agent, either randomly, pseudo-randomly or according to one or more guidelines, with an inventory area selected for each item automatically, such as by software executing on a control system, in some embodiments. An agent or control system may record the selected inventory area for each item in a product database, which may include a description, inventory location number, or other data representing the inventory area in which the item is to be stored, along with position and/or descriptive information for the item (e.g., such as an image of the item, or an image-derived position of the item), indexed by a product identification code, for example. In some embodiments, images (e.g., before and/or after images or in real-time with the respective process) of the inventory location may be captured during the stow process and the pick process.

A picking agent may be provided instructions to locate and obtain a particular item from an inventory area. The instructions may include the stored location, position, and/or descriptive information for the item, and may be usable by the picking agent to locate and identify the item to be obtained, or "picked." In different embodiments, the term "agent" may refer to a human person working in the materials handling facility or to an automated piece of equipment configured to perform the operations of an agent, as described herein. For example, in some embodiments, a robotic device may perform the role of a stowing agent or a picking agent.

A laser and image-enabled system may be used to facilitate operations in such a materials handling facility, including, but not limited to, stowing and picking operations. For example, a laser and image-enabled device may be configured to capture images of items as the items appears at the storage location and send the images to a control system that is also part of the image-based capture/display system. An image-based capture/display device may request the images from or the images may be sent from the control system to the image-based capture/display device for display, or to determine and illuminate a position of the item, for example, to an agent attempting to pick the item. A laser and image-enabled system may comprise various components in various arrangements. In one example, the laser and image-enabled system may a comprise a control system and any number of variously configured devices used to capture images, display images, illuminate positions of items or display other information about items. In another example, a laser and image-enabled system may include more or fewer components such as a laser and separate image-enabled device or a scanner and separate position illumination device. Various other arrangements and combinations of the various components described herein are also contemplated.

One or more devices may provide images or position information in such a manner as to facilitate efficient picking of an item by an agent by reducing the cognitive load placed on a picker attempting to locate the position of a particular item. For example, a device (e.g., a laser and image-enabled device) may point to the position of the unit of the item to be picked using a laser or other illumination to indicate the particular unit of the item. In some embodiments, a picking agent may be provided with an image of the item or the retail packaging of the image to facilitate the pick. The image may be the image of the item from a product page of the item, for example. However, the item itself or the retail packaging of the item may be hidden when the item is stored in the inventory area, for example, by shipping packaging. Therefore, in some embodiments, it may be useful to provide the picker with an image of the shipping packaging of the item or to illuminate the position of the unit of the item to be picked. In some embodiments, displaying such an image to a picker or illuminating the position of the unit of the item may facilitate more expedient picking and/or reduce the cognitive recognition load placed on a picker trying to find the unit of the item in the inventory area.

In some embodiments, the position of the illumination may be determined from images. Images of items in the inventory area may be gathered during and used to facilitate operations in a materials handling facility, including, but not limited to, stowing and picking operations. An image or images of the item as the item appears in the inventory area may be obtained in several different ways. For example, images of items may be obtained as part of receiving the item at the materials handling facility (e.g., as part of a dimension scan or as part of an item imaging process at receiving). However, obtaining an item image at receiving may add additional time to the process of receiving items and may not fully capture what the item looks like while stowed in the inventory area, for example, if received pallets or containers of items are not broken down completely until the stow process.

Another method of obtaining an image of the item is to capture an image of the item while the item is in the inventory area. For example, agents may be tasked or directed to capture images of items in the inventory area as part of an item image obtainment process that obtains images of items outside of the other processing of the materials handling facility. In another example, image capturing may be performed as part of the already existing, day-to-day activities of the materials handling facility. For example, images of items may automatically be captured as part of the stowing and/or picking process. Some material handling facilities operate to stow items to inventory by a particular method. One such method in particular involves an agent navigating to an area of the inventory area where space is available to stow an item. The agent may then scan an identifier (ID) of the item, scan an ID of the particular inventory area or storage location (e.g., a storage bin or shelf, an indicated area of the floor, a pallet or the like), place the item in the particular inventory area and then scan the ID of the particular inventory area again. Scan may mean that a device captures an identifier, and any particular scan may also include sending the identifier to the control system. An image of the item in the particular storage area may be captured during this process. For example, an image of the inventory may be captured concurrent with the overall stowing process, or more specifically, as part of scanning the ID of the particular inventory area before and after the item has been placed in the particular inventory area. Alternatively, or additionally, an image of the item may be obtained in a similar fashion during the pick process. As described in various embodiments disclosed herein, the image of the item in the inventory area may be captured by a device used to scan the ID of the item and inventory area or by an image capture device separate from the device used to scan the ID of the item, for example, a fixed camera at an inventory station that mobile inventory locations are delivered to. In some embodiments, images may be captured from devices mounted throughout the facility (e.g., ceiling mounted or rack mounted devices).

Images of items in storage bins may be captured before and after a picking or stowing process. For example, a diff process may be used to determine the difference between the before and after images. In some embodiments, the difference between the before and after images should be an image of the item as it appears in the storage location and may be extracted and saved as an image of the item. The process may involve extracting numerous images of numerous units of the item from numerous pick and/or stow operations across numerous storage locations. This process of gathering images of items as they appear in inventory may be performed repeatedly to capture multiple images of the item (e.g., from different angles, in various packaging, etc.) to allow for variances in how the item is packaged or how the item appears or how the item is placed in an inventory area. One or more representative images may be selected for the item using any of various techniques (e.g. image-quality based or machine learning techniques, etc.). The representative images may be used to support numerous processes within a materials handling facility, for example during picking or to perform an image-based inventory analysis, etc.

The image of the item may include the entire storage bin or some portion of the storage bin in addition to the item. Various markers on the storage bin or other inventory areas may be captured in the images. The markers may support such functionality as determining the size of the item in the image or the orientation of the storage bin or camera used to capture the image. For example, the markers themselves may be of a known size or may graphically indicate dimension information such that only one marker need be captured in an image to be used to determine dimension data of an item in the image. In other embodiments, a distance between two or more markers may be known such that when two markers are captured in an image, the known distance between the two can be used to determine the size of items also in the image. The image of the item may include additional units of various items that appear next to or otherwise nearby the item in the inventory area (e.g., storage bin). Various methods may help to distinguish the item from the other items in the storage bin. For example, images of the inventory area before and after either of the stowing or picking process may be compared. The difference between the before and after image may be an image of the item that was stowed or picked. This process of gathering images of items as they appear in inventory may be repeated to gather numerous images of the item such that one or more exemplary images may be selected as representative of the item in the inventory area. Selection of the one or more exemplary images may include analyzing the collected images. For example, an analysis of the collected images for an item may determine whether all of the images are actually images of units of the same item. Another example of the analysis may include determining whether the packaging of an item is similar across all units, or that some units are stored in different containers that have a different appearance from other units of an item of the same type Other characteristics for which image analysis may be performed include the image size, image quality or representativeness of the image of the unit for the group.

Representativeness may be a measure of how well the image of one particular unit of the item serves as a representation for other units of the item. In some embodiments, more than one image of the item may be selected as representative images of the item. For example, some shipping containers are six sided cardboard boxes. The boxes may be stowed randomly among other items and may also be stowed in various orientations (e.g., askew, upside-down, on their side). As such, in one embodiment, six images of the item, one for each side of the box, may each be associated with item. In some embodiments, when an item image is used to determine what type of item a unit is or the position of the item in storage area, some or all of the six images may be used to try to match the unknown item with images of known items. Such analysis may include analysis of an images color, size, textual content, shape and the like. In some embodiments, images of the items and the storage bins may be used to keep an image-based inventory, as described herein. In various embodiments, the images that are captured are captured from a point of view that matches with the point of view used by a laser and image-enabled device to point a laser at a unit of an item. However, in some embodiments, software, such as perspective correction software may be used to alter, correct or align the perspective of imagery from disparate perspectives. In some embodiments, stow etiquette rules may regulate how an item is stowed such that all of the units of the item look the same when viewed in the inventory location, for example, that a product identifier is always facing outward, right-side up.

Once a representative image or images of the item has/have been selected, they may be used to support multiple forms of functionality. For example, the representative image of the item may be used as part of an item unit position analysis that determines the item unit's particular position at an inventory location such that a laser or other illumination can illuminate the position of the unit of the item. In another example, the representative image may be supplied to an agent that is attempting to pick the item. Some estimates have placed the amount of time a picker stands scanning a storage bin for an item at anywhere from about 5-20 seconds, depending upon various circumstances. A picker may be slowed down by any number of characteristics of the picker, the inventory area or items. For example, a picker may not know whether a particular book has a thin or thick spine, or a book with a thin spine may be difficult to discern from other books in the inventory area. In another example, the picker may be unaware that versions of an item exist or may be unfamiliar with how the packaging indicates the differences between versions of the item. Pointing to the position of the unit of the item and/or providing the picker with an image of the item as the item appears in inventory may reduce the amount of time the picker spends looking for the item in the inventory area. In some embodiments, a laser beam may further facilitate efficient picking due to the trail of light a laser beam makes through the air as it illuminates a particular position. The trail of light through the air from the laser may stand out to the picker more readily than other picking assist systems and devices, such as pick to light systems and devices. Position illumination may also be used to illuminate positions for stowing items, in some embodiments.

In some embodiments, a system that uses a laser and image-enabled device may reduce the amount of stow and pick etiquette violations. Accordingly, item position illumination and item image comparison may be used to enforce picking and stowing etiquette, for example. In some embodiments, illumination of the position of the particular unit of the item to be picked may ensure that etiquette rules are followed, for example, an etiquette rule may be that the unit on the left is picked first, before another unit of the same item is picked from the same inventory location. By illuminating the particular unit on the left, it is more likely that the picker will pick the correct unit of the item (the one on the left) instead of another unit of the item in the same inventory location. Display of the unit of the item, as the item appears in the inventory location may facilitate adherence to etiquette rules as well. Similar benefits may be obtained for stowing as well, for example, when multiple locations are available within a particular inventory location to stow an item. In some embodiments, etiquette rules may be stored in memory as logic, for example in data store 302, and enforced by one or more etiquette software modules configured to apply the stored etiquette rules, for example, during analysis of images of items at an inventory location.

In addition or as an alternative to still images, video may also be used to implement the methods disclosed herein. For example, video technology may be used to capture the image of the item in the inventory area. Some devices may operate with a video capability that is always on or that may be configured to capture video at certain times, for example, when an item or a storage bin is being scanned. In some embodiments, devices with video capability, such as always on video capability may continuously save video images (e.g., to a shallow video buffer). Some event (e.g., a scan or other event during a pick or a stow) may trigger the content of the buffer to be saved and images from the saved content may be used in a similar fashion as the images described herein (e.g., to obtain item images as described herein).

The laser and image-enabled devices employed in a materials handling facility may utilize any of various laser-based display technologies, including, but not limited to, a Micro-ElectroMechanical Systems (MEMS) technology. In some embodiments the laser and image-enabled devices and/or control system may be coupled to one or more sensors, scanners, RFID readers, or cameras usable for calibrating the laser-based devices with respect to one or more references within the facility whose locations are known. The control system may also be coupled to a product database or other data store configured to store respective location and position information (e.g., alpha-numerically or image-based) associated with each item handled within the facility, and the control system may be configured to store this location information for each item. The location and position information for each item may indicate a location at which the item was stowed or a location at which the item is to be stowed (e.g., the location at which the control system determines it should be stored, whether or not the stowing operation has been completed) as well as the position information for the position of the item within the inventory location. In some embodiments, the control system may be configured to access the stored location information for a given item when determining the targeted inventory area and when determining a path to the targeted inventory area. Such a product database may also be configured to store position and/or descriptive information, which may be accessed by the control system and provided to the laser and image-enabled devices to point the laser at the position.

The system described herein may in some embodiments be configured to present all of the information needed to reach a targeted inventory area (e.g., path information), to identify a given position of an item within the targeted inventory area (e.g., position information), and/or to identify a given item within the targeted inventory area (e.g., descriptive and image information) at the same time (e.g., at the beginning of a stowing or picking operation). For example, the laser may illuminate the position of the device at the inventory location while a display simultaneously displays an image of the inventory location with the position of the unit of the item highlighted along with some or all of the other information. In other embodiments, different types and/or amounts of information may be presented to an agent as the stowing or picking operation progresses. For example, only path information may be presented to an agent until he or she reaches a targeted inventory area, and then additional information may be presented, such as the image of the item and the laser illumination of the position of the inventory location as the agent reaches the location. In some embodiments, an image-based display system may be used in conjunction with one or more other types of communication devices (e.g., handheld communication devices, laser projection devices, RFID tags and/or readers, scanners, and/or cameras) to carry out the various operations of the materials handling facility. For example, in some embodiments, stations that receive storage units via mobile drive units may display highlighted images of the location of items within the storage bin on a display that is separate from a scanning device used by the agent picking items from the storage bin, while a laser pointer points to the position of the unit of the item.

The methods described herein may in various embodiments be implemented by any combination of hardware and software. For example, in one embodiment, the methods may be implemented by a computer system that includes a processor executing program instructions stored on a computer-readable storage medium coupled to the processor. The program instructions may be configured to implement the functionality described herein (e.g., the functionality of the control system, product database, laser and image-enabled devices, and/or other communication devices).

Various processes of gathering and using images of items as the items appear in an inventory location are disclosed. FIG. 1 illustrates an implementation of one such process, which, in one embodiment, may cause a laser to be pointed at a particular unit of item among numerous heterogeneous units of items at an inventory location. The position that the laser points to may be based on a captured image of a unit of the item, as the unit appears in inventory. The laser may be pointed at the item to help an agent that has been directed to pick the item from the inventory location find the position of the item in the inventory location. As illustrated in FIG. 1, an order fulfillment facility or other materials handling facility may include an inventory management system employing a laser and image-enabled system in various operations of the facility. In various embodiments, the system may include an item image component 200, control system 100, and laser controller component 202. In the illustrated example, the laser and image-enabled device 110 is projecting a laser to illuminate the position of a unit of an item to be picked. In some embodiments, an identifying image (illustrated in FIG. 10, described below) of the item may be used to determine the position of the unit of the item such that the laser can be pointed at the position. In some embodiments, laser and image-enabled device 110 may capture various images or video of the inventory area while the laser is illuminating, for example, to provide feedback to the laser pointer for adjustment, or the like. In some embodiments, the control system may send the identifying image of the item or the position of the unit of the item to the laser and image-enabled device 110 before or during the pick such that the position of one or more units of the item to be picked can be illuminated by laser and image-enabled device 110 (illustrated as during pick 108).

FIG. 1 illustrates that, once a picking agent has reached the correct inventory area, a laser and image-enabled device 110 may project additional visual guidance for identifying and/or locating the particular item to be picked. For example, the laser and image-enabled device 110 may project a laser beam pointing at the position of the item. In some embodiments, the control system may store position and dimension information for all of the items stowed in the inventory area. In some embodiments, the position and dimension information may have been determined based in image analysis described herein, either as a pre-processing analysis before the position and/or dimensions of the item is needed or in real-time with a picking or stowing process associated with the item. In various embodiments, the laser and image-enabled device may be programmed to point to a particular item by the control system, which may determine the item's position based on image-based analysis of the items in the inventory area or otherwise. For example, if, based on image-based pre-processing, a unit of an item to be picked is known (from image analysis) to be at a particular position at the inventory location, the laser and image-enabled device may be programmed to project a laser beam at the position in the inventory location where the item should be located.

Figure 2:
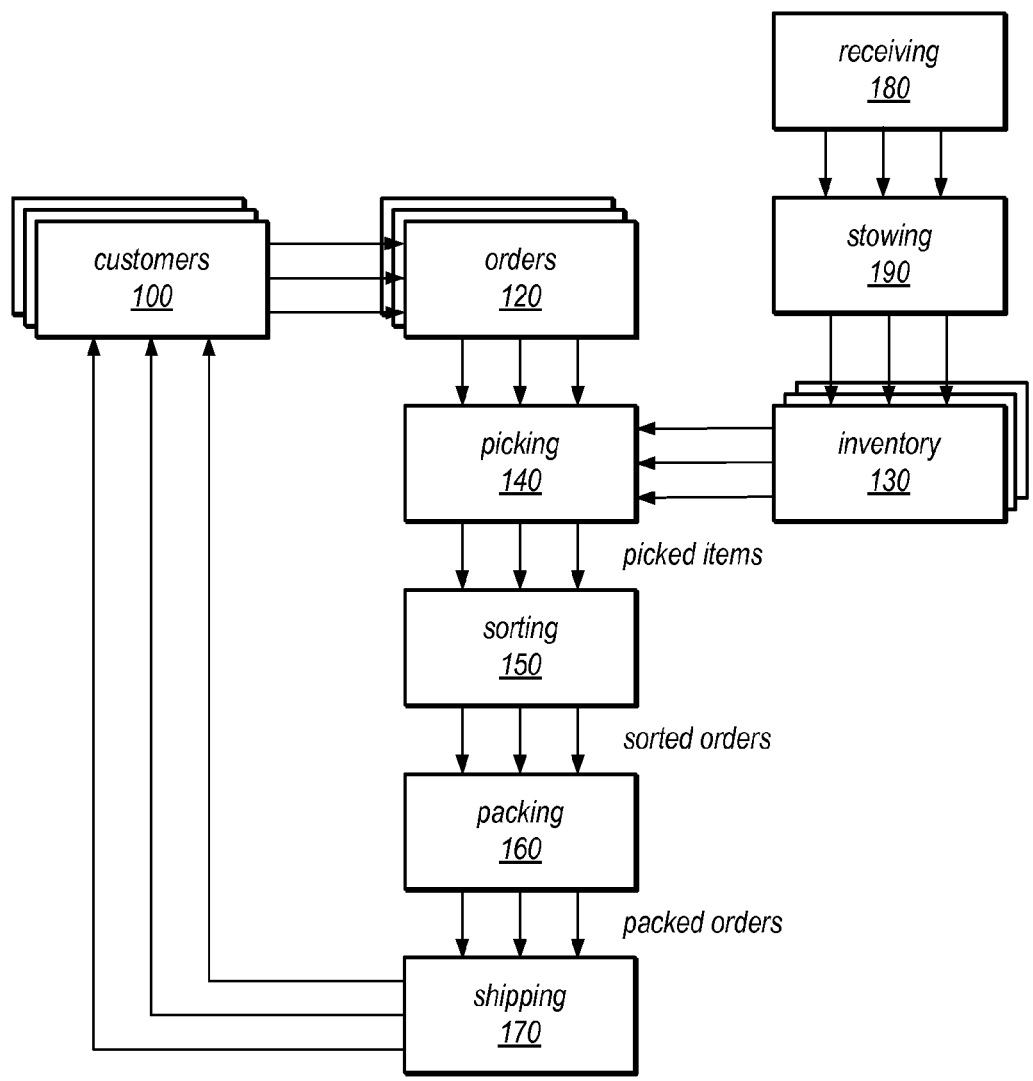
FIG. 2 illustrates a broad view of operations of a facility, which, in one embodiment, may be configured to utilize an item image capture and display system, according to some embodiments.

An order fulfillment facility or other materials handling facility may include an inventory management system employing an item image capture and display system in various operations of the facility. FIG. 2 illustrates a broad overview of the operations of one such facility, which, in one embodiment, may be configured to utilize a laser and image-enabled system as described herein. In this example, multiple customers 100 may submit orders 120 to the distributor of the items in the facility, where each order 120 specifies one or more items from inventory 130 to be shipped to the customer that submitted the order. To fulfill the customer orders 120, the one or more items specified in each order may be retrieved or "picked" from inventory 130 (which may also be referred to as stock storage) in the order fulfillment facility, as indicated by block 140. In some embodiments, items may be identified from inventory based on information presented to fulfillment facility personnel using an item image capture and display system, as described herein. In various embodiments, the information presented may include a description of the item to be picked, position information for the items within a given inventory area, images of the item to be picked as the item appears in the inventory area and/or illumination of the position of the unit of the item at the inventory location. Picked items may be delivered to one or more stations in the order fulfillment facility for sorting 150 into their respective orders, packing 160, and finally shipping 170 to the customers 100. A picked, packed and shipped order does not necessarily include all of the items ordered by the customer; a shipped order may include only a subset of the ordered items available to ship at one time from one inventory-storing location.

An order fulfillment facility typically also includes a receiving operation 180 for receiving shipments of stock from various vendors and a stowing operation, illustrated as stowing 190, for placing the received stock into stock storage (inventory 130). In some embodiments, stowing 190 may involve stowing an item in a location within inventory 130 selected by a control system (e.g., randomly, pseudo-randomly, or according to various guidelines for stowing similar or different items within the facility). Various embodiments may implement stow etiquette rules that define expected stow behavior when stowing an item. In some embodiments, stowing 190 may involve capturing a before and/or after image when adding items to one of the plurality of inventory areas in inventory 130. A laser and image-enabled system may, in some embodiments, be used to direct a stowing agent to a particular location within the inventory area and/or position within the inventory location in which an item is to be stowed, as described herein.

In some embodiments, an order fulfillment center may receive an order for an item not currently in the center's inventory. When the item is received, the order may then be filled and shipped. When an order is received for an item before the item has been received at an order fulfillment center, the received item may or may not be stocked into inventory before being matched up with the order and shipped out, according to various embodiments. The receipt of the item at the facility may trigger the fulfillment process for a pending order. The various operations of an order fulfillment facility may be located in one building or facility, or alternatively may be spread or subdivided across two or more buildings or facilities.

Positional item information and/or item images, as described herein in various embodiments, may be used to locate a given item to be picked from inventory 130. For example, in some embodiments, fulfillment center personnel, sometimes called agents, who retrieve ordered items from inventory 130, may be presented with position and/or descriptive information (e.g., points of illumination on a particular unit of an item or at particular location) to quickly locate specific items in inventory 130 without, for example, having to read an item label, such as a book or CD title. The position and/or item images may be presented to the agents using an item image display system or light-based illumination system or device. For example, one or more item image display devices may be mounted within the facility and may display position information and/or item images so they are visible to the agents or direct a light-based illumination at a position of a unit of the item. Laser and image-enabled devices may include but are not exclusive to hand-held laser and image-enabled devices, stationary laser and image-enabled devices, screen-based laser and image-enabled devices or image projection laser and image-enabled devices, etc.

A laser and image-enabled system, as described herein, may be utilized in a number of different facilities and situations, including, but not limited to material handling facilities, order fulfillment centers, rental centers, distribution centers, packaging facilities, shipping facilities, libraries, museums, warehouse storage facilities, shopping centers, grocery stores, car parking lots, etc. In general, a laser and image-enabled system may be used in any situation in which stowage and/or picking of items is desirable.

A laser and image-enabled system as described herein in various embodiments, may be utilized in several areas of a materials handling or order fulfillment facility such as during receiving 180, stowing 190, picking 140, sorting 150, packing 160, and shipping 170. For example, in some embodiments a laser and image-enabled system may present item images and/or directions to agents who retrieve ordered items from inventory 130, so that they may quickly locate and identify specific items in inventory 130. Sorting agents, who sort items collected by picking agents, may utilize a laser and image-enabled system to speed the process of grouping items by order. For example, a laser and image-enabled system may present to the agent a list, descriptions, or images of the items that are to be grouped together, or point to the items that are to be grouped together with the laser.

Accordingly, an order fulfillment center may include one or more receiving stations 180 for receiving shipments of stock from various vendors. The received stock may then be placed into stock storage in one or more inventory areas. During stowing 190, the control system may determine the locations and/or positions for stowing items in inventory areas randomly, pseudo-randomly, or according to one or more positional placement guidelines, in different embodiments. When an item is stowed, image analysis, either real-time, before-and-after-based or determined from a most recent image, may be used to determine the item's position.

A laser and image-enabled system may also aid packing agents to efficiently select an appropriately sized container for shipment, to locate the correct hopper or container being used to ship a group of items, to direct a group of items to the correct packing station, or to perform other operations, according to various embodiments (e.g., to point to the hopper or container, etc., with the laser). In yet another embodiment, position information and/or descriptive information may be used in a receiving station of a materials handling facility. For example, receiving personnel may be presented with instructions or images or laser-based guidance to direct them to place received items on a particular pallet or conveyor belt, or to deliver the items to a particular inventory area within the facility for unpacking and storage. For example, images of empty available inventory locations may be determined and displayed to the personnel or a laser may illuminate the inventory locations. In some embodiments, empty available locations may be determined by the processes described herein.

According to certain embodiments, the position information may then be available to control system devices, communication devices, or other computer devices, as described below. For example, a control system may access the position information and may use it to generate messages that include instructions for a picking agent that are transmitted to a laser and image-enabled device and presented to the picking agent when the item is included in a customer order. Similarly, dimension information may be determined or estimated (e.g. using the image analysis techniques described herein) for items received and stored in inventory 230 and this information may be stored in a product database and associated with a product identification code or other item or product information. In some embodiments, this descriptive information may be used in the image analysis determining the position of the item in the inventory location. Some of this information may be used to point a laser at the position of the unit of the item, in various embodiments.

A materials handling facility may, in various embodiments, include different arrangements of fixed-location and/or movable laser and/or image-enabled devices. For example, in some embodiments, an array of such devices may be mounted on the ceiling of the facility, and/or a series of such devices may be mounted on walls, floors, poles, or shelving units within the facility. These laser and/or image-enabled devices may be networked together (e.g., wirelessly or by wire) and/or configured to communicate with a control system, such as to receive messages from the control system that include instructions executable to point the laser at a position or capture an image. The laser and image-enabled device may also be configured to receive messages from a control system or from an agent (e.g., via a handheld remote control device) including instructions executable to alter their position (e.g., their orientation and/or angle). For example, a laser and image-enabled device may be directed to rotate, sweep, point in a particular direction, or "paint" an image within the facility based on instructions received from a control system or agent.

Figure 9:
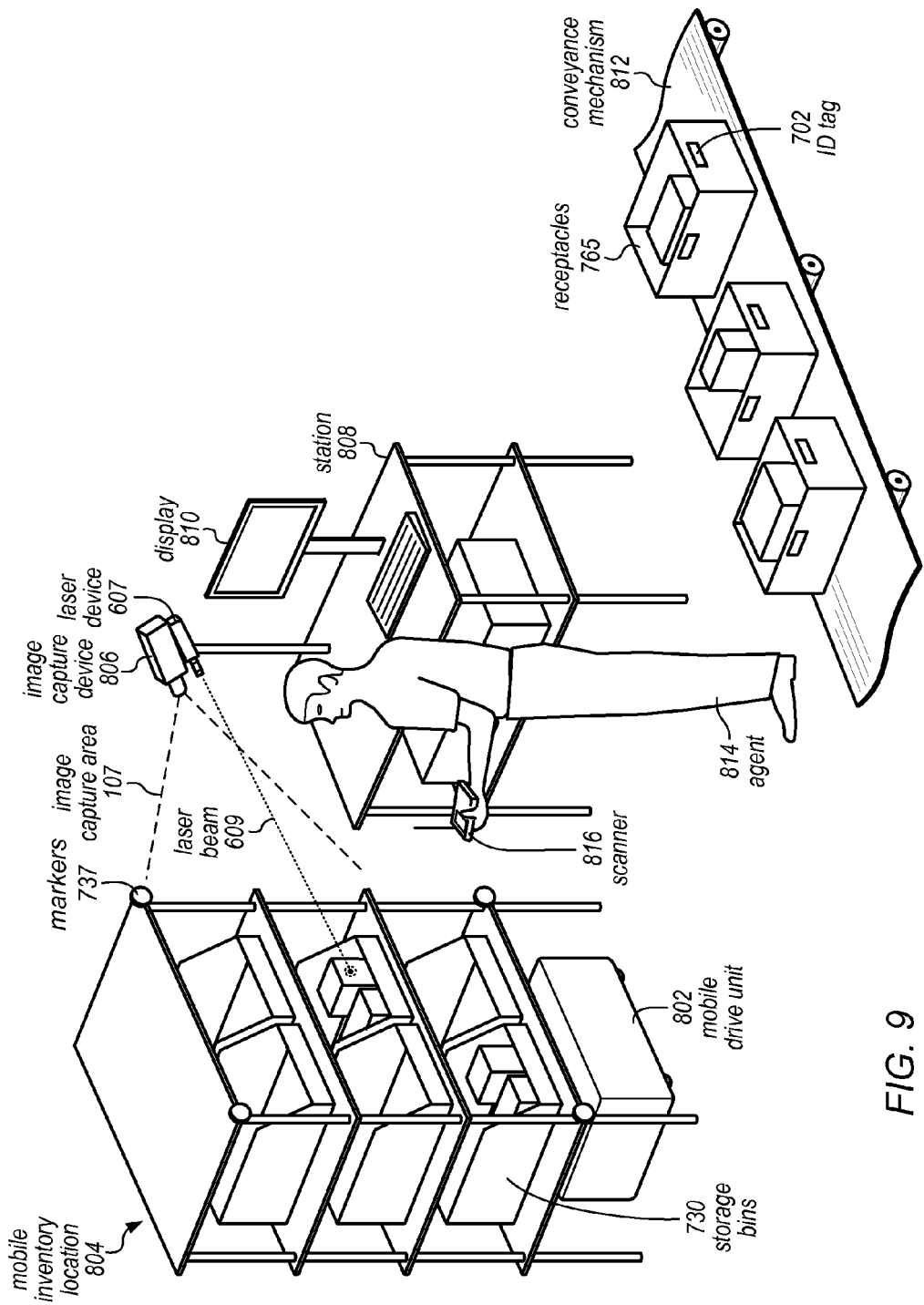
FIG. 9 is an illustration of a fulfillment center with mobile inventory locations, according to some embodiments.

The laser and image-enabled device 110 illustrated in FIG. 1 is illustrated as a single, portable device. In embodiments, laser and image-enabled device 110 may be rigidly mounted (e.g., to the ceiling or a pole or an inventory location such as a storage bin) and may comprise more than one device (e.g., a separate image capture device and a separate laser-enabled device as illustrated in FIG. 9).

The arrangement and order of operations illustrated by FIG. 2 is merely one example of many possible embodiments of the operation of an order fulfillment facility utilizing an item image capture and display system. Other types of materials handling, manufacturing, or order fulfillment facilities may include different, fewer, or additional operations and resources, according to different embodiments.

Figure 3:
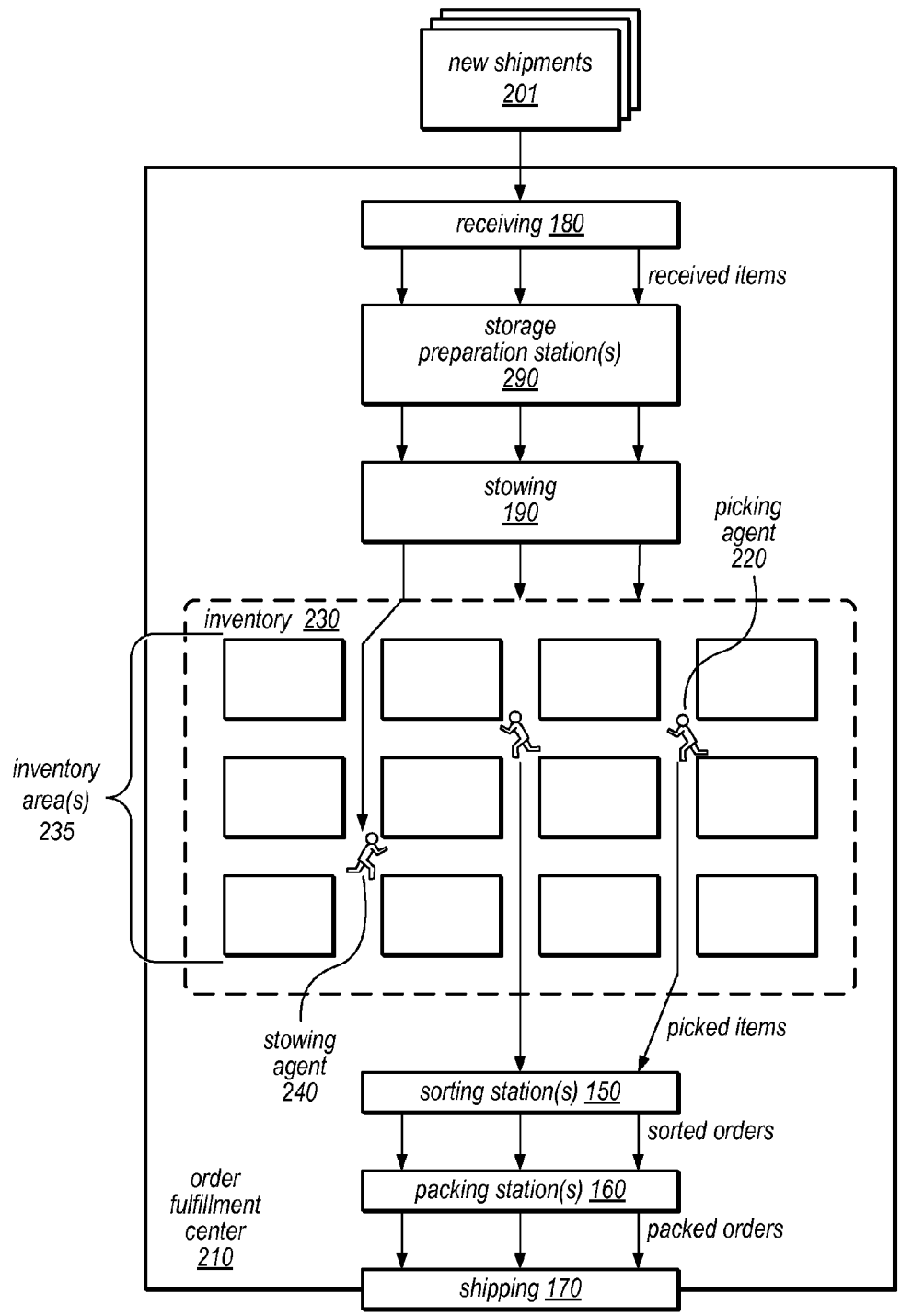
FIG. 3 illustrates a physical layout for an order fulfillment center, according to one embodiment

As illustrated in FIG. 3, an order fulfillment center may include one or more receiving stations 180 for receiving shipments of stock from various vendors. The received stock may then be placed into stock storage in one or more inventory areas 235 of inventory 230, in one embodiment during a stowing operation (illustrated as stowing 190 in FIGS. 2 and 3). As noted above, the control system 100 may, in some embodiments, be configured to determine the location and/or position of a stowing agent 240 and may generate stowing instructions for the agent that are dependent on the agent's current location within inventory 230. The stowing instructions may be displayed to the agent via various displays described herein and may direct the agent to an inventory area. Once a picking agent has reached the correct inventory area, a laser and image-enabled device may project additional visual guidance for locating the position in the inventory area in which the item is to be stowed. For example, the laser and image-enabled device may project a laser beam pointing to the position at which the item should be stowed, or any other information suitable for locating the position at which the item should be stowed.

During stowing 190, the control system may determine the locations and/or positions for stowing items in inventory areas 235 randomly, pseudo-randomly, or according to one or more positional placement guidelines, in different embodiments. When an item is stowed, image analysis, either real-time, before-and-after-based or determined from a most recent image, may be used to determine the item's position. For example, real-time image analysis during stowing may be performed by comparing an identifying image (illustrated in FIG. 10, described below) of the item to an image of the inventory area where the item was stowed that was captured in real-time with the stowing operation, perhaps from live video or from a still image captured when the inventory location id is scanned at the end of the stow process. Before-and-after image analysis may be performed by capturing images of the inventory location before and after the stow is performed by the agent. The before and after images may be compared to determine a difference between the images. In some embodiments, the difference between the images may be the position of the item when it was stowed. An indicator of the stowed item position may be stored in a product database and associated with a product identification code or other item or product information, in some embodiments. In some embodiments, an identifying image of the item may be compared to a most recent image of the inventory location to determine the position of the unit of the item at the inventory location.

The stations of an order fulfillment center may be arranged in many different configurations, according to various embodiments. FIG. 3 illustrates an arrangement for an order fulfillment center 210, according to one embodiment. At any time, one or more picking agents 220 may each be picking items from inventory 230 to fulfill portions or all of one or more orders, and/or one or more stowing agents 240 may be placing items in inventory 230. According to some embodiments, an item image capture and display system may present information such as images of inventory areas with items to picking agents 220 and stowing agents 240, for example, to increase speed and efficiency when locating items from among different items that may be co-located in a single inventory area 235 and when stowing items within an inventory area 235. For example, an item image capture and display system may present a picking agent 220 with instructions to direct him or her to a particular inventory area 235, and additional information (e.g., position information, dimension information, image(s) of the item, image(s) of the item in the inventory area or other descriptive information) to assist him or her in locating one or more items from the inventory area 235. Similarly, an item image capture and display system may present instructions to a stowing agent 240 to direct him or her to a particular inventory area 235, and may present additional information (e.g., text or image information) to assist him or her in locating the specific position within the inventory area 235 in which an item is to be placed.

After obtaining items from inventory 230, picking agents 220 may transfer those items to sorting stations 150, according to one embodiment. Not every fulfillment facility includes both sorting and packing stations. In certain embodiments, agents may transfer picked items directly to a packing station, such as packing station 160, and the picked items may be directed to a particular packing station by control system 100. In other embodiments, agents may transfer picked items to a combination sorting and packing station (not illustrated). This may result in a stream and/or batches of picked items for multiple incomplete or complete orders being delivered to a sorting station 150 for sorting into their respective orders for packing 160 and shipping 170, according to one embodiment illustrated by FIG. 3. Portions of an order may be received at different times, so sorting 150 and packing 160 may have to wait for one or more items for some orders to be delivered to the sorting station(s) 150 before completion of processing of the orders. A stream or batches of incoming picked items may be sorted into their respective orders at the sorting station(s) 150. While, in some embodiments, automated sorting may be utilized, such as through the use of Crisplant® or Eurosort® sorters, in other embodiments sorting may be performed manually. In yet other embodiments, both manual and automatic sorting may be used in combination. Once an order is completed at a sorting station 150, the order may be ready to proceed to a packing station 160 to be packaged for shipping 170.

Figure 5A:
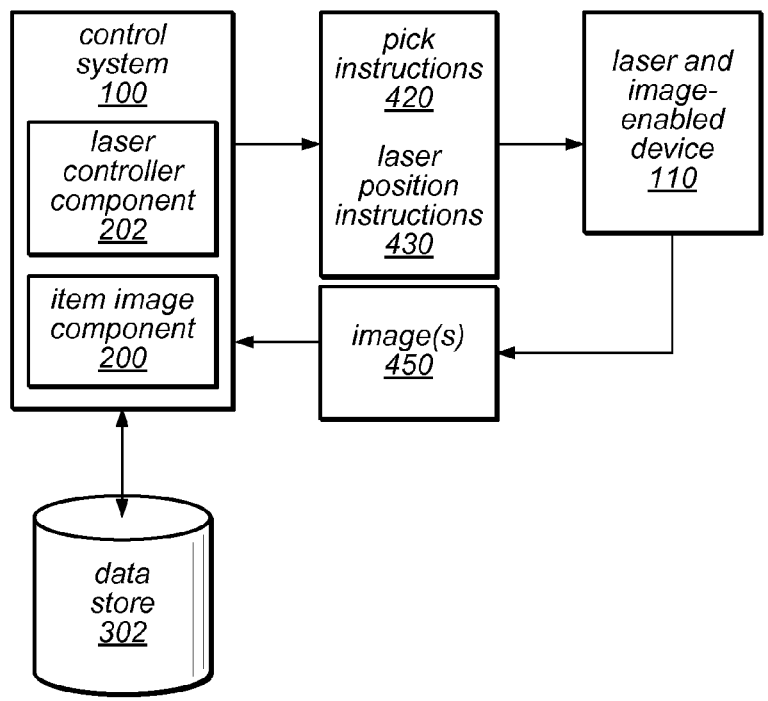
FIG. 5A illustrates the data flow between a control system and a laser and image-enabled device, according to one embodiment.
Figure 5B:
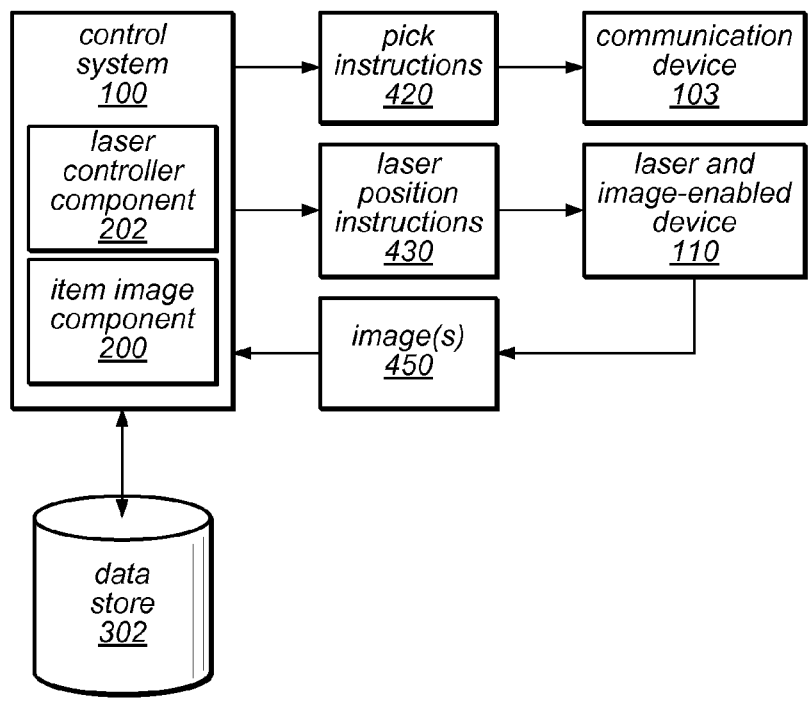
FIG. 5B illustrates the data flow between a control system and a laser and image-enabled device as well as a communication device, according to one embodiments.

An order fulfillment facility such as an order fulfillment center 210 may implement an order fulfillment control system, or control system for short, as part of its overall inventory management system. A control system (such as illustrated in FIGS. 1, 5A and 5B and described below) may include hardware and software configured for assisting and/or directing agents in the order fulfillment center 210 in fulfilling customers' orders. For example, in some embodiments, such a control system may transmit information such as instructions and one or more item images to display devices, which may display the instructions and other information such as item images to a picking agent 220 or a stowing agent 240.

Items in inventory 230 may be marked or tagged with a bar-code, radio frequency identification (RFID) tag, Universal Product Code (UPC), Stock-Keeping Unit (SKU) code, serial number, and/or other designation (including proprietary designations) to facilitate order fulfillment center 210 operations, including, but not limited to, picking 140, sorting 150 and packing 160. These designations, or codes, may identify items by type, and/or may identify individual items within a type of item. The control system may also include, or may be used in conjunction with, handheld, mobile and/or fixed scanners or scanning devices that may be able to scan the marks or tags on individual items and/or inventory areas 235 to determine and record an identifier of an item and/or an item location. In some embodiments, a control system may be configured to access location, position and/or descriptive information for items (e.g., from a product database or other data store) and may provide this information to picking agents 220 along with other information indicating items to be obtained from inventory, as will be described in more detail below. Inventory locations may also be marked in a similar fashion.

The control system may, in some embodiments, be configured to determine the location and/or position of a picking agent 220 or a stowing agent 240 (e.g., using an indirect asset tracking device or other communication device worn or carried by the agent) and may generate stowing or picking instructions for the agent that are dependent on the agent's current location within inventory 230. For example, the control system may transmit messages including instructions for the agent to a laser and image-enabled device 110 that is near the agent, and this laser and image-enabled device 110 may display information suitable for directing the agent from his or her current location to the location of an item to be picked.

As described above, an order fulfillment center may include one or more receiving stations 180 for receiving shipments of stock from various vendors. The received stock may then be placed into stock storage in one or more inventory areas 235 of inventory 230 during a stowing operation (illustrated as stowing 190 in FIGS. 2 and 3), in some embodiments. As described above, the control system may, in some embodiments, be configured to determine the location and/or position of a stowing agent 240 and may generate stowing instructions for the agent that are dependent on the agent's current location within inventory 230. For example, the control system may transmit messages including instructions for the agent to a laser and image-enabled device 110 that is near the agent, and this laser and image-enabled device 110 may display visual guidance suitable for directing the agent from his or her current location to the location in inventory in which an item is to be stowed. Once a picking agent has reached the correct inventory area, the laser and image-enabled device 110 may display an image of the inventory location in which the item is to be stowed and/or may illuminate the position of the unit of the item, with a laser or otherwise.

During stowing 190, the control system may determine the locations and/or positions for stowing items in inventory areas 235 randomly, pseudo-randomly, or according to one or more positional placement guidelines, in different embodiments. When an item is stowed, an indicator of its position may be stored in a product database and associated with a product identification code or other item or product information, in some embodiments. According to certain embodiments, the position information may then be available to control system devices, communication devices, or other computer devices, as described below. For example, a control system may access the position information and may use it to generate messages that include instructions for a picking agent that are transmitted to a laser and image-enabled device 110 and presented to the picking agent when the item is included in a customer order. Similarly, dimension information may be captured or estimated, and/or pattern-based information may be assigned or captured, for items received and stored in inventory 230 and this information may be stored in a product database and associated with a product identification code or other item or product information. This descriptive information may be accessed by the control system, transmitted to a laser and image-enabled device 110, and presented to a picking agent instead of, or in addition to, any position information associated with the item, in different embodiments. The position information may be used to illuminate the position of the unit of the item, in various embodiments.

As described above, many fulfillment facilities store different copies of items in different individual inventory areas within stock storage. Storing copies of items in multiple inventory areas may shorten the distance, and therefore the time, required to obtain an item from inventory, in some embodiments. Additionally, different items may be stored in a single inventory area, according to certain embodiments. Storing different items together may result in more efficient use of total inventory space than using a single inventory area for multiple copies of a single item or product. It still may be beneficial in some embodiments to store similar items together to make better use of inventory space. For example, storing different books together on a single inventory shelf may use the available inventory space more efficiently than storing one book among other items of greatly differing size and shape, such as electronic devices, clothing, toys, hardware, materials, or other items. Thus, in some embodiments, a fulfillment facility may store items of similar shape and size together in a single inventory area. For instance, in such an embodiment, items such as books, compact discs (CDs), and digital video discs (DVDs) may all be stored together. In some embodiments, multiple copies of an item may be stored together with multiple copies of other, different items. For example, a single inventory area may store multiple copies for each of several different books, CDs, or other items.

In certain embodiments, items may be randomly stored together in inventory areas. Such random storage may increase storage efficiency and may in some cases increase the likelihood that any individual item may be easily distinguished from the other items with which it is stored. Random storage of items may also decrease the amount of time needed to store individual items into inventory. A control system for the facility may track where each item is stowed. As previously described, in some embodiments, determining where to store an item may be performed manually, while in other embodiments, it may be an automated process performed by one or more computer software programs based on pattern information associated with the individual items, and/or based upon positional placement guidelines, as described below.

When obtaining a particular item from an inventory area storing different items, picking agents may have to carefully examine each item in the inventory area to properly identify the specific item to be picked. For example, if a picking agent is instructed to obtain a single copy of a book, CD, or DVD that is stored among other different books, CDs, or DVDs, the agent may have to read the title of each item in turn to identify the specific one to pick. For example, it may take a picking agent additional time to distinguish from among multiple, different CDs all of whose titles include "Greatest Hits."

In some embodiments, a laser and image-enabled device 110 may be used to display position information corresponding to the relative position of the item to be picked, or images of the actual item as it appears in the inventory area, so that the agent may not have to carefully read the title of each CD in the inventory area until the correct one is encountered. The laser and image-enabled device 110 may illuminate the actual position of the unit of the item to be picked as well or as an alternative, in some embodiments.

Various aspects of a laser and image-enabled system may be incorporated or rely upon position-based item identification. As such, a materials handling facility may, in some embodiments, operate using one or more sets of positional placement guidelines governing how items are stored in inventory areas. In various embodiments, different types of items may be stored according to different guidelines (e.g., stow etiquette). For example, books may be stored on shelves according to a guideline specifying that books should always be added to the right of any other books or other items already in the inventory area. In other examples, clothes on hangers may always be added to the right of other clothes, clothes stored on shelves may always be added to the top of a stack of clothes, or CDs and DVDs may always be added to the front of a group of similar items lined up front to back on a shelf or in a bin. In other embodiments, different guidelines may be applied to different inventory areas or to different types of inventory areas. For example, items stored on narrow shelves may always be added on the right, while items stored on deep shelves or in bins may always be added to the front. In another example, if items of different sizes and shapes are stored together in an inventory area, a placement guideline may specify that items should be placed in order of size, such as with the largest item adjacent to one side of the inventory area and successively smaller items placed next to each other toward the middle or the other side. In other embodiments, more complex guidelines for stowing items may take into account a combination of size, shape, pattern information, or other criteria in determining a position in which to place an item in an inventory area. In other embodiments, when items are added to inventory areas storing many different items that are easily distinguished from each other, the items may be added without regard to any positional placement guidelines, and the position at which an item is stowed may need to be input to the control system by the stowing agent in order to be able to retrieve it using position-based item identification.

As described above, a fulfillment center configured to fulfill orders may include a plurality of receiving stations configured to receive items for storage, a plurality of inventory areas configured to store the received items, and a plurality of packing stations configured to package items selected from the inventory areas. An agent may traverse the fulfillment center, directed to the appropriate inventory areas by a display device (e.g., a laser and image-enabled device), and may select each item from one or more of the inventory areas. The agent may use additional information presented by the display device to locate each item within an inventory area and transfer it to one of the packing stations. In some embodiments, a handheld communication device may be used to scan an identifier of a picked item to determine if it is the correct item. Similarly, during a stowing operation, an agent may be directed to a particular inventory area using a handheld communication device, and then the agent may use a handheld communication device to scan an identifier of the inventory area and/or to enter information indicating the position within the inventory area at which the item was actually stowed. For example, a handheld communication device may include a scan device for reading bar-type scan codes, such as a SKU or ISBN on an item or may be configured to communicate with a separate scan device to receive such codes and communicate them to the control system.

Figure 4:
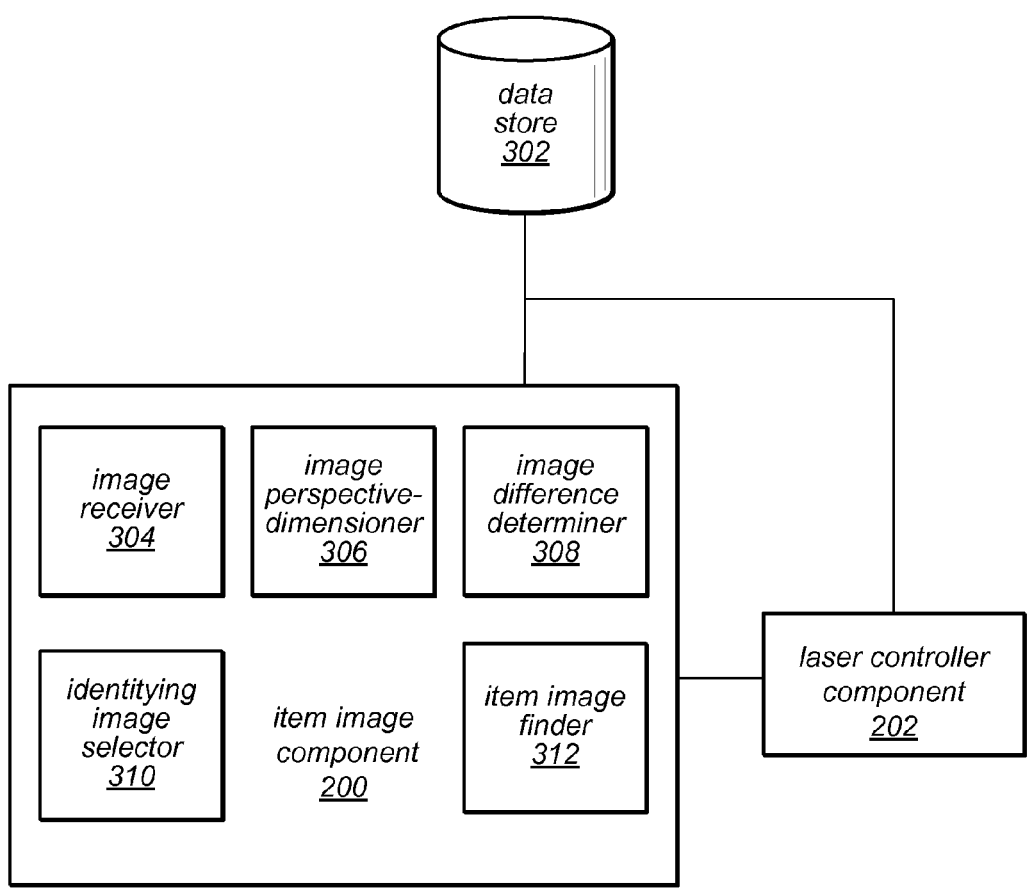
FIG. 4 illustrates an item image component, laser controller component and a data store, in accordance with some embodiments.

FIG. 4 illustrates an item image component 200, laser controller component 202 and a data store 302. The item image component 200 and the laser controller component 202 may be part of and interact with a control system 100 (as illustrated in FIG. 1) and may be coupled to a data store 302. Alternatively, part or all of item image component 200 and/or laser controller component 202 may be separate from control system 100 and perform functions separate from control system 100, or one another. For example, item image component 200 may be configured to run on a server and may send message to laser controller component 202 that may be configured to run on a laser and image-enabled device 110. In some embodiments, data store 302 may be an enterprise data store configured to store all or most of the data of an enterprise (e.g., materials handling facility). In other embodiments, data store 302 represents a distributed collection of various independent data stores each tailored and particularly suited to the data contained therein. As illustrated in FIG. 4, data store 302 stores location and position information for each item and respective item images for each item of a material handling facility. Data store 302 may also include another data store, such as a product database for storing location information associated with each item handled within the facility.

The item image component 200 may be configured to store the item images for each item to data store 302 and the control system 100 may be configured to store the location information for each item to data store 302. The item images for each item may illustrate what an item looks like when the item is stowed at an inventory location. The location information for each item may indicate a location at which the item was stowed or a location at which the item is to be stowed (e.g., the location at which the control system determines it should be stored, whether or not the stowing operation has been completed). In embodiments, the item image component may be configured to send and receive images of items and inventory locations from and to data store 302 as well as various devices of the materials handling facility (e.g., laser and image-enabled devices). The control system may be configured to access the stored location information for a given item when determining the targeted inventory area and when determining a path to the targeted inventory area. The item image component 200 may be configured to access item images and inventory location images and send those images to various display devices that may be used to display the images in order to facilitate various functions within the materials handling facility, such as picking items, for example. Item image component 200 may include various software modules that each provide various specialized functionality pertaining to item images. While the software modules are illustrated as part of item image component 200, alternative embodiments are contemplated wherein one or more of the software modules exist outside of the item image component 200.

Item images may be images of items of the materials handling facility and may be received by image receiver 304 and stored in data store 302. The images may include contextual imagery surrounding the item such as other items in the same inventory location, other inventory locations, other items in other inventory locations, laser beams and various position illuminations, etc. In some embodiments, item images may be of the item itself, without other items in the image. Data store 303 may store various item images and for various reasons. Item images may be stored such that they are linked to a particular item, for example when they illustrate a visual depiction of an item in inventory. Item images may also be retained in storage such that they are linked to an inventory location, for example, when they illustrate a (e.g. recent) visual depiction of some or all of the items currently in the inventory location. In some embodiments, these item images may alternatively be referred to as inventory location images.

Figure 6:
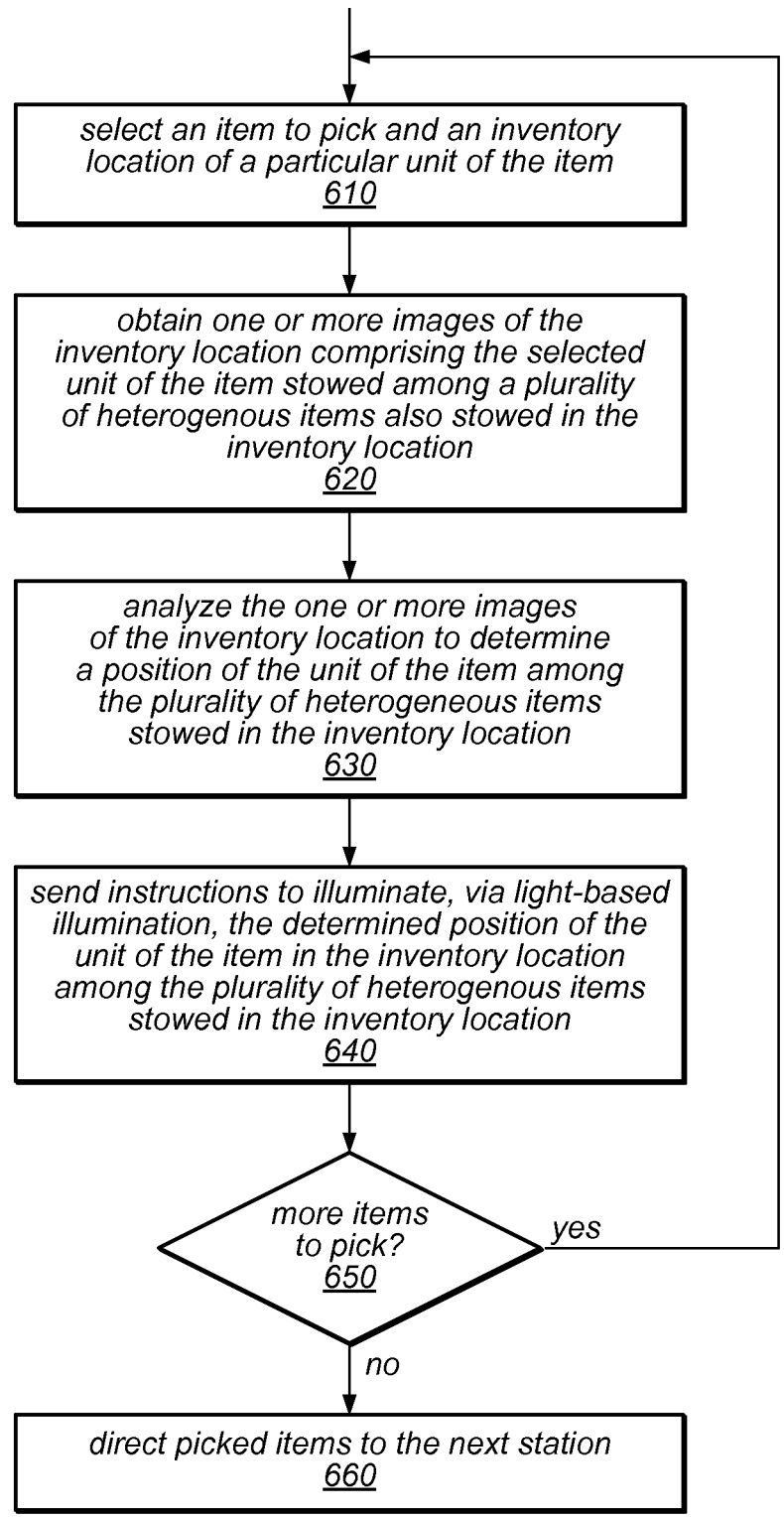
FIG. 6 illustrates a flow diagram of an item selection, position determination, and position illumination process, according to one embodiment.

Image receiver 304 may be part of item image component 200. Image receiver 304 may receive images from various image capture devices of the materials handling facility. For example, a laser and image-enabled device, such as a scanner with image capture capability may capture an image of an item when an inventory location associated with an item is scanned. In some embodiments, such a scan and image capture may happen when an item is stowed or when an item is picked. Image receiver 304 may receive the captured image of the item from the laser and image-enabled device and send the image of the item to data store 302, for example. Some of the functionality associated with image receiver 304 is illustrated in FIG. 6, described below.

Image perspective-dimensioner 306, illustrated in FIG. 4, may also be part of item image component 200. Image perspective-dimensioner 306 may process item images to adjust certain characteristics of the images such as perspective, or to extract data from the images, such as item dimensions. In some embodiments, image perspective-dimensioner 306 is tightly tied, programmatically to the other components 304-312 of item image component 200. For example, image perspective-dimensioner 306 may provide an API or other form of interface for the modules of item image component 200 to directly interact with image perspective-dimensioner 306. Any of various image processing techniques known to one of skill in the art may be applied to the images for various reasons. For example, two images (e.g., a before stow and an after stow image) may be analyzed and processed such that a comparison, or "diff" of the images will result in the identification of an image of the item that was stowed. Any of various techniques known to one of skill in the art may be applied to the images (e.g., perspective adjustment, resizing, color adjustments, image quality adjustments, etc.) in order to prepare the images for the diff such that the resulting image of the item better exemplifies what the item actually looks like as stowed in the inventory location. For example, in various embodiments, image perspective-dimensioner 306 may analyze the positional relationship between a plurality of graphical indicators (illustrated in FIG. 7, described below) to determine a distortion of the before or the after image of the storage location. The image perspective-dimensioner 306 may perform an alignment process, wherein the alignment process includes perspective correction. In other embodiments, qualities of the image, such as horizontal lines or vertical lines may be may be relied upon instead of the graphical indicators illustrated herein (e.g., to perform processes such a perspective correction). Similar processes may be applied when an image of a particular item is compared to an image of an inventory area, to determine if the item is in the inventory area, for example, or to determine an item position. Some of the functionality of image perspective-dimensioner 306 is illustrated in FIGS. 6, 9 and 13, described below.

Figure 10:
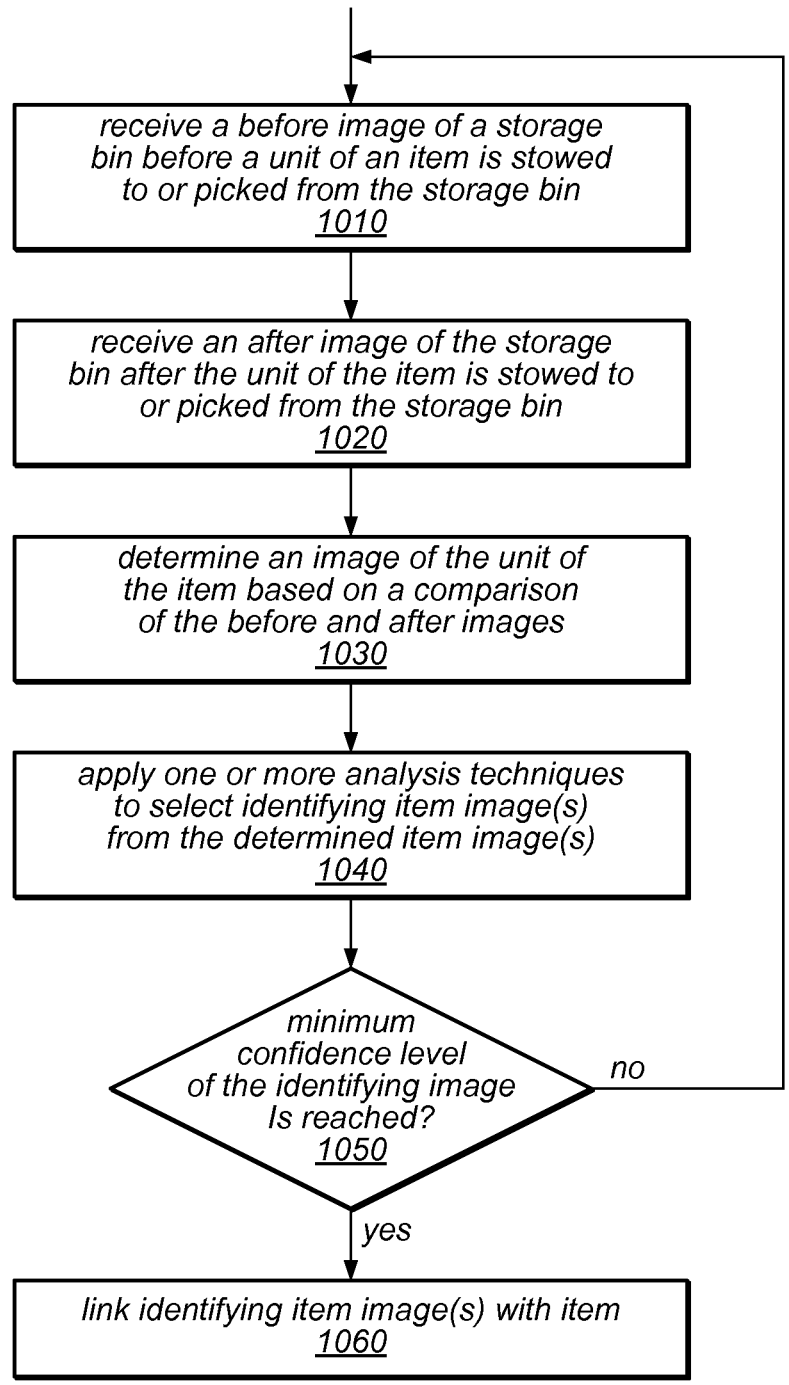
FIG. 10 is a flow chart illustrating a process of determining one or more identifying item images of an item, according to some embodiments.

Image difference determiner 308 may be part of item image component 200, as illustrated in FIG. 4. Image difference determiner 308 may determine the difference between two images. As described in one of the examples described above, image difference determiner 308 may compare two images of an inventory area and determine a difference between the two images. The difference may be an image of the item that was missing from one of the images. In another example, image difference determiner 308 may compare a known image of an item to an image of an inventory area to determine if and/or where the item appears in that inventory area. Some of the functionality of image difference determiner 308 is illustrated in FIGS. 6, 9 and 10, described below.

Identifying image selector 310 is illustrated as part of item image component 200 in FIG. 4. Identifying image selector 310 may select one or more identifying images of an item (illustrated in FIG. 10, described below). For example, image receiver 304 may receive a plurality of images (e.g., numerous before and after images) of an item that has been stowed. The images may be processed by image perspective-dimensioner 306 and image difference determiner 308 may determine images of the stowed item by diffing (e.g., determining the differences between) the processed before and after images. Identifying image selector 310 may analyze the determined images of the item and select one or more of the images as identifying images of the item. Identifying image selector 310 may analyze the images using relatively simple or more complicated techniques. For example, image selector 310 may select any particular image as an identifying image based upon any of numerous image quality characteristics such as color, contrast, sharpness and the like. In another embodiment, identifying image selector 310 may use various machine learning techniques to select one or more identifying image(s) for an item. Various functionality associated with identifying image selector 310 is illustrated in FIG. 6, described below.

Some of the methods disclosed herein may be used to display an image of the item to a picker attempting to pick a unit of an item. Some of the methods disclosed herein may be used to direct the picker to a particular position in the inventory area or storage bin as well. The representative image of the item may be used to determine the position of the item in a particular inventory area. For example, various techniques may be used to compare the representative image of the item to an image of a storage bin holding numerous items. In one example, a recent image of the storage bin from the recent stowing or picking of a unit of another item to or from the storage bin may be have been captured during the stowing or picking. In some embodiments, when the image was captured, an image-based storage bin inventory analysis may be performed. For example, one or more representative images of items expected to be in the storage bin (e.g., from inventory records) may be compared to the image of the storage bin. When a match is found, a position of the item in the image of the storage bin that is matches may be determined and/or the inventory record may be verified for that item. This process may be repeated for some or all of the items expected to be in the storage bin, as a storage bin inventory check process for example. In some embodiments, such a process may be used to verify that items in a pick list are actually on the shelves indicated by the pick list before the pick list is directed to be picked, thus avoiding the loss of time to missed picks. In some embodiments, the inventory check is performed in an ongoing process instead of coordinated particularly with the pick process. Another way to determine the position of the item in the inventory area may be to determine the position of the difference between the before and after images of the inventory area where the item was stowed.

The position of a unit of an item may be indicated to an agent tasked with picking the item in numerous ways. For example, the image of the storage bin may be displayed and the position of the item or the item itself may be highlighted or otherwise indicated in the displayed image of the storage bin. Another way to indicate the position of the item in the storage unit is to illuminate the position of the unit of the item in the storage bin (e.g., by laser illumination and the like). Determining an item position in a storage bin may be performed ahead of time, dynamically on-the-fly in real-time or near real-time with respect to the agent's arrival at the storage bin, scan of the bin or receipt of instructions to pick the item. For example, an image capture device may capture an image of the storage bin when the picker arrives; the image of the storage bin may be compared with the image of the item to determine the position of the item, and the position of the item on the storage bin may be indicated to the picker via a laser pointer. Also, in some embodiments, a before image may not be necessary. For example, stored records of the inventory of the storage bin may be used to determine and indicate the position of the item, either before or as the picker arrives at the storage bin of the item to be picked. For example, a record of the position of the item on the bin (determined earlier via the image-based analysis herein or otherwise) may be accessed and indicated to the agent, such as by illuminating the position in the actual bin.

Item image finder 312 is illustrated as part of item image component 200 in FIG. 4. Item image finder 312 may use one or more of the identifying images selected by identifying image selector 310 to determine and/or highlight a position of a unit of the item in an inventory location of the materials handling facility. For example, item image finder 312 may compare an identifying image, or characteristics of an identifying image of the item to images of inventory areas to determine if the particular inventory area includes the item, for any of numerous uses. For example, if the inventory area does not include the item, an inventory record may be updated. If the inventory area does include the item, a position of the item in the inventory area may be determined, for example, either by locating the item image in the image of the inventory area or by applying the dimension information gathered from the image by the image perspective-dimensioner 306.

In some embodiments, item image finder 312 may analyze feedback from images gathered while the laser or other illumination is being projected into the field of view of the image capture device. For example, laser and image-enabled device 110 may project a laser beam and capture an image of the position that the laser beam illuminates at the same time. The position of the actual illumination may be determined, for example using the techniques described herein (e.g., before and after images of the illumination), or otherwise. In one example, item image finder 312 may be configured to recognize a particular wavelength (e.g., 532 nm or green lasers, 650-670 nm or red lasers, etc.) in the image of the inventory area and to determine the position of the wavelength in the image as the position of illumination. The actual position of the illumination may be used to support various features, such as position adjustments to the illumination position that are responsive to movement of the target (e.g., a mobile inventory location) or responsive to movement of the laser source (e.g., a mobile laser and image-enabled device 110), for example. In some embodiments, illumination position adjustments may be made when the initial illuminated position was incorrect, for example the position that the laser is pointed in may be adjusted based on feedback determined from comparing a current position the laser is actually illuminating with the determined position the laser is intended to be illuminating, wherein adjusting the direction the laser is pointed brings the laser illumination upon the determined position.

In various embodiments, item image finder 312 may analyze captured or real-time images to determine facial features in the images and avoid projecting the laser at the determined face. In some examples, item image finder 312 may analyze imagery for facial features. If facial features are recognized, item image finder 312 may send an alert or an instruction to laser controller 202 to instruct the laser to stop projecting the laser or to project the laser away from the recognized face. The facial feature analysis may for be performed continuously, or for a defined period of time. In some embodiments, item image finder 312 may analyze the imagery in an area surrounding the path of the laser for facial features. Various functionality associated with embodiments of item image finder 312 is illustrated in FIGS. 9, 10A and 10B, described below.

FIG. 4 illustrates laser controller component 202 connected to item image component 200 and data store 302. Laser controller component 202 may interact with the various modules of item image component 200. In some embodiments, laser controller component 202 may receive instructions from control system 100 to illuminate a unit of an item with a laser beam, obtain the position of the unit of the item and direct a laser device to point the laser at the obtained position.

In some embodiments, control system 100 may instruct item image component 200 and laser controller component 202 to provide pick instructions to a laser and image-enabled device 110 for a particular unit of an item. For example, image receiver 304 may request and receive an image of the inventory location while the agent or bin is at a pick location. Item image finder 312 may obtain an identifying image of the item and compare the identifying image of the item to the image of the inventory location to determine a position of the unit of the item. Item image finder 312 may store the position in data store 302 or pass the position to laser controller 202. Laser controller component 202 may receive an instruction to illuminate the position of the item unit, and obtain the position, either from the data store 302 or from item image finder 312. Laser controller component 202 may send instructions to a laser and image-enabled device 110, directing the device to illuminate the position of the unit of the item.

In various embodiments, laser controller component 202 may send coordinates of the position to be illuminated. For example, when a laser and image-enabled device 110 is mounted in a fixed location and calibrated to use predetermined coordinates to illuminate various positions as instructed. In some embodiments, item image finder 312 may determine the position of the unit of the item with reference to various markers in the image and use a dimension ratio determined from the image of the inventory location and known dimensions of objects in the image (e.g., markers or item dimensions) to determine a reference position (e.g., 3 inches left, 2 inches down) of the unit of the item with reference to a known position of an object in the image (e.g., markers). Item image finder 312 may pass the reference position to the laser controller component 202 that may instruct a laser and image-enabled device 110 to use the reference position to illuminate the unit of the item. For example, the a laser and image-enabled device 110 may receive the reference position and orient the laser at the reference position (e.g., 3 inches left, 2 inches down) with respect to the known position.

In FIG. 4, the various modules 304-312 of item image component 200 are illustrated as part of item image component 200. In various other embodiments, the various components may be arranged otherwise. For example, some or all of modules 304-312 may be part of other components. One, some, or all of the modules 304-312 may be implemented entirely or partially on a single device or across multiple devices. For example, in an embodiment, the image receiver 304, image perspective-dimensioner 306, image difference determiner 308 and identifying image selector 310 may all be implemented on one or more servers while item image finder 312 may be implemented wholly or partially on laser and image-enabled device 110. Laser controller component 202 may also be implemented partially or entirely on a single device, or across multiple devices. For example, in one embodiment, laser controller component 202 may be implemented partially on the same one or more servers as modules 304-310 and partially on laser and image-enabled device 110. All of portions of the item image component 200 and laser controller component may be implemented in various different ways and across various different devices including communication devices, scanners, servers, heads up units, laser and image-enabled devices, image capture devices, laser devices, displays, etc. These devices may include various components such as those illustrated in FIG. 14, described below.

As previously noted, a control system of a materials handling facility may be configured to provide an agent with instructions for picking or stowing items and/or with location information, position information, and/or descriptive information about items and/or inventory areas by communicating data to a laser and image-enabled system to initiate projection of illumination upon a position of a unit of an item, in various embodiments. The laser and image-enabled system may then project the illumination onto the position of the unit of the item to assist the agent with a picking or stowing operation. FIGS. 5A and 5B illustrate a control system 100 coupled to a data store 302 (e.g., product database) in which location, position, and/or descriptive information is stored and associated with the items handled in the materials handling facility. In this example, control system 100 may be configured to consult data store 302 to retrieve information about an item and/or an inventory area and may also be configured to determine what information should be presented to picking/stowing agents for a given picking/stowing operation. For example, during a picking operation, control system 100 may access data store 302 to determine an inventory area from which a picking agent should retrieve an item. The control system may also access position and/or descriptive information such as item images, positions of particular units of item and the like, for the item from data store 302. Control system 100 may be configured to determine how much of the available information should be sent to laser and image-enabled device 110 to be displayed to an agent and may process the information so that it may be presented to the agent, as described herein.

FIGS. 5A and 5B also illustrate a picking process, respectively, in an order fulfillment center such as the one depicted in FIGS. 7 and 8, described below. FIG. 5A illustrates data flow to and from an image-based capture/display device 105 during a picking operation, according to one embodiment. In this example, an agent has been directed to a stationary, multi-shelf section of an order fulfillment center to stow an item with item in an inventory area (e.g., inventory area 235). As illustrated in FIG. 5A, the agent carries a single laser and image-enabled device 110, which in some embodiments, may communicate the agent's location to a control system in the fulfillment center (not shown). In embodiments, laser and image-enabled device 110 may have been used to direct the agent to the multi-shelf area.

As illustrated in FIG. 5A, control system 100 may generate and send messages including pick instructions 420 and laser position instructions 430 to laser and image-enabled device 110, in some embodiments. Control system 100 may, in some embodiments, access data store 302 or another device to retrieve text-based item descriptions, clip art or other vector-based graphics data (e.g., drawings representing outlines of items or inventory areas), font data, images of items, item unit position information and/or item inventory areas, or any other data that may be sent to laser and image-enabled device 110 for display. In other embodiments, control system 100 may execute software configured to convert text, graphics, and/or image data into an input format compatible with these image-based display devices (e.g., a machine language or other instruction encoding) before sending it to the devices. In such embodiments, the laser and image-enabled device 110 may include relatively simple logic for executing the encoded instructions to present the desired text or images.

In the example illustrated in FIG. 5A, pick instructions 420 may include a list of one or more items to be picked (i.e., a "pick list"), which may include item identifiers, quantities, identifiers of an inventory area in which each item on the list is stored, instructions for directing an agent within the facility (e.g., path information), and/or laser position instructions 430 that may include the position information of the unit of the item. In another example, pick instructions 420 may include a list of one or more items to be stowed, identifiers of the items, identifiers of inventory areas in which each is to be stowed, path information for directing the agent to the inventory areas and/or laser position instructions 430 that may include the position information of the position to stow a unit of the item. Control system 100 may be configured to send a stow list or list of items to be stowed to laser and image-enabled device 110 as a text file, in some embodiments. These lists may be presented to an agent all at once, or information about each item on a list may be presented individually, on an as-needed basis.

In this example, the agent has been directed by pick instructions 420 sent from the control system 100 to the laser and image-enabled device 110 to pick a unit of the item from an inventory area. Once the stowing agent reaches the targeted inventory area, control system 100 may send one or more messages (e.g. illumination instructions and pick instructions) to the laser and image-enabled device 110 to pick the item. The laser and image-enabled device 110 may respond to the illumination instructions by projecting a laser to illuminate the position of the unit of the item. In some embodiments, (not illustrated) the message may include location, position and/or descriptive information that may be displayed to the pick agent to aid the agent in locating the particular position in which the item is to be picked from, as described herein. For example, control system 100 may send a text file to the laser and image-enabled device 110 that includes a description of where the item should be picked from (e.g., "top shelf, $3^{rd}$ from right," or "to left of blue box") as well as the position information used to illuminate the position with the laser of the laser and image-enabled device 110.

During the pick process, the method may include capturing one or more images (e.g., before and after images) of the inventory location and sending the one or more images to the control system. The method may include storing the one or more images in data store 302. The system and methods described above regarding a pick operation may be similarly applied to a stow operation FIG. 5B illustrates a communication device 103 and a laser and image-enabled device 110 in a picking operation, according to one embodiment. As illustrated in FIG. 5B, the agent carries a communication device 103, which, in some embodiments may communicate the agent's location to a control system in the fulfillment center (not shown). In embodiments, communication device 103 may have been used to direct the agent to the multi-shelf area. In still other embodiments, communication device 103 may present all or a portion of a pick list to the agent. Such a pick list may indicate that the item is a book, and may include the title of the book, for example. In various embodiments, communication device 103 may receive information from a control system controlling the filling of orders to present to the agent as will be described below regarding FIGS. 8 and 9. The information may include picking instructions 420 (e.g., an inventory location identifier that identifies the inventory location, and an identifying item image that visually identifies the item as the item appears in the inventory location). Communication device 103 may display some or all of the picking instructions 420 (e.g., item ID, inventory location identifier and/or the identifying item image. The agent may use some or all of this information in order to pick the item as directed.

As previously noted, in some embodiments, a laser and image-enabled system may be used in conjunction with a laser and image-enabled device 110 with a reduced or limited feature set. For example, as illustrated in FIG. 5B, control system 100 may send pick instructions 420 (e.g., an item identifier, highlighted item image and descriptive information to aid the agent in locating the particular item to be picked), to communication device 103 for directing a picking agent to a particular inventory area to pick an item. When the picking agent reaches the targeted inventory area, control system 100 may send laser position instructions 430 to the laser and image-enabled device 110. In some embodiments, control system 100 may be configured to access a data store 302 to obtain such information for an item to be picked. For example, control system 100 may retrieve a text file from data store 302 that includes a description of the item and/or its position within the inventory area (e.g., "bottom shelf, orange mug," "$2^{nd}$ book to right of *War and Peace*," or "green DVD, white logo"). In another example, control system 100 may retrieve an image file from data store 302 that shows what the item looks like as it is stored in the inventory location. In yet another embodiment, the position of the unit of the item may be retrieved from data store 302 or determined by item image finder 312, as described herein. These retrieved files may be sent to the communication device 103 by the control system, so that the communication device 103 may display the information and/or images to the picking agent. In some embodiments, the retrieved files may be sent the laser and image-enabled device 110. For example, the position of the unit of the item may be sent to laser and image-enabled device 110.

The picking instructions 420 of the picking process may be explicit or the agent may be familiar with various rules or picking etiquette that directs the agent to follow a certain protocol when picking an item. For example, if there are multiple units of the item in the storage location, the agent may be directed to, or may understand that pick etiquette dictates picking the unit of the item on the left. To pick the item, the picker may scan the inventory location, pick the item, and then scan the inventory location the item was picked from once again. In another embodiment, the agent may scan the inventory location once, either before or after the pick. One or more item images (e.g., recent item images) may be captured during the picking process (perhaps triggered by the scan of the inventory location). In some embodiments, the inventory location identifier that was scanned as well as the captured item image(s) 450 may be sent from the laser and image-enabled device 110 to control system 100, where it may be stored to data store 302. While the item image(s) 450 may not include an image of the item that was picked (e.g., if the item image was captured after the pick), the item image 490 may include the most recent image(s) of other item(s) in the storage location. In some embodiments, before and after images may be captured as part of the pick process. In some embodiments, these recent images that also include images of the other items may be used for various processes, such as the one illustrated in FIG. 10, described below.

The picking process may include determining an inventory area in which the given item is stored. For example, in some embodiments a control system, such as control system 100, may access a product database, such as data store 302, in order to obtain stored location information, position information, and/or an image of the given item. This information may have been stored when the given item was stowed, as described above, or at another time, in different embodiments. For example, an image of the item may be captured and stored when an item is received at the facility, or location information may be stored when a targeted inventory area is determined, but before it is stored. In some embodiments, the control system may also obtain information about other items stored in the same inventory area from the product database.

If the agent is able to locate the item, he or she may remove the item from the inventory area, or "pick" the item. In some embodiments, when an item is picked, an indication of success may be sent to the control system, which may update the product database to reflect the removal of the given item. The control system may also update position information for one or more of the remaining items in the inventory area based on the removal of the given item. If the item was found in the inventory area, but not in the position indicated by the presented position information, the agent may provide feedback to the control system indicating that that an error was detected in the determined and/or stored position information for the item (not shown). In some embodiments, the agent may capture an image of the misplaced item in the wrong position.

After the item is picked, the method may include verifying that the correct item was picked. For example, in some embodiments, when the picking agent picks the given item, he or she may scan an identifier of the item (e.g., using a handheld communication device such as a scanner or a laser and image-enabled device 110). An identifier of the item may include an item's inventory identification number, Universal Product Code (UPC), Stock-Keeping Unit (SKU) code, model number, version number and/or other designation (including proprietary designations), according to various embodiments. The picking agent may send, the item identifier to the control system (e.g., using the communication device), which may compare the identifier to that of the item on the pick list. In such embodiments, the control system may send an indication to the picking agent that the correct item was or was not picked by sending the indication to the communication device and/or to the laser and image-enabled device 110 to be presented to the agent.

In some embodiments of picking or stowing, before and after images may both be retained for any of various reasons. For example, before and after images may be used to determine the position of a stowed item, such that the item may be located and picked. In another example, before and after images may be used to determine what the item looks like when stowed. In yet another example, before and after images of a pick may be used to verify that the correct item was picked. Other uses are contemplated as well. For example instead of both the before and after images being retained, only the most recent after image may be retained. In some embodiments, the before image may be removed once an initial set of processing has been performed on it, for example, performing a diff to determine an identifying item image or using the before image to location the position of the item before it is picked.

Figure 8:
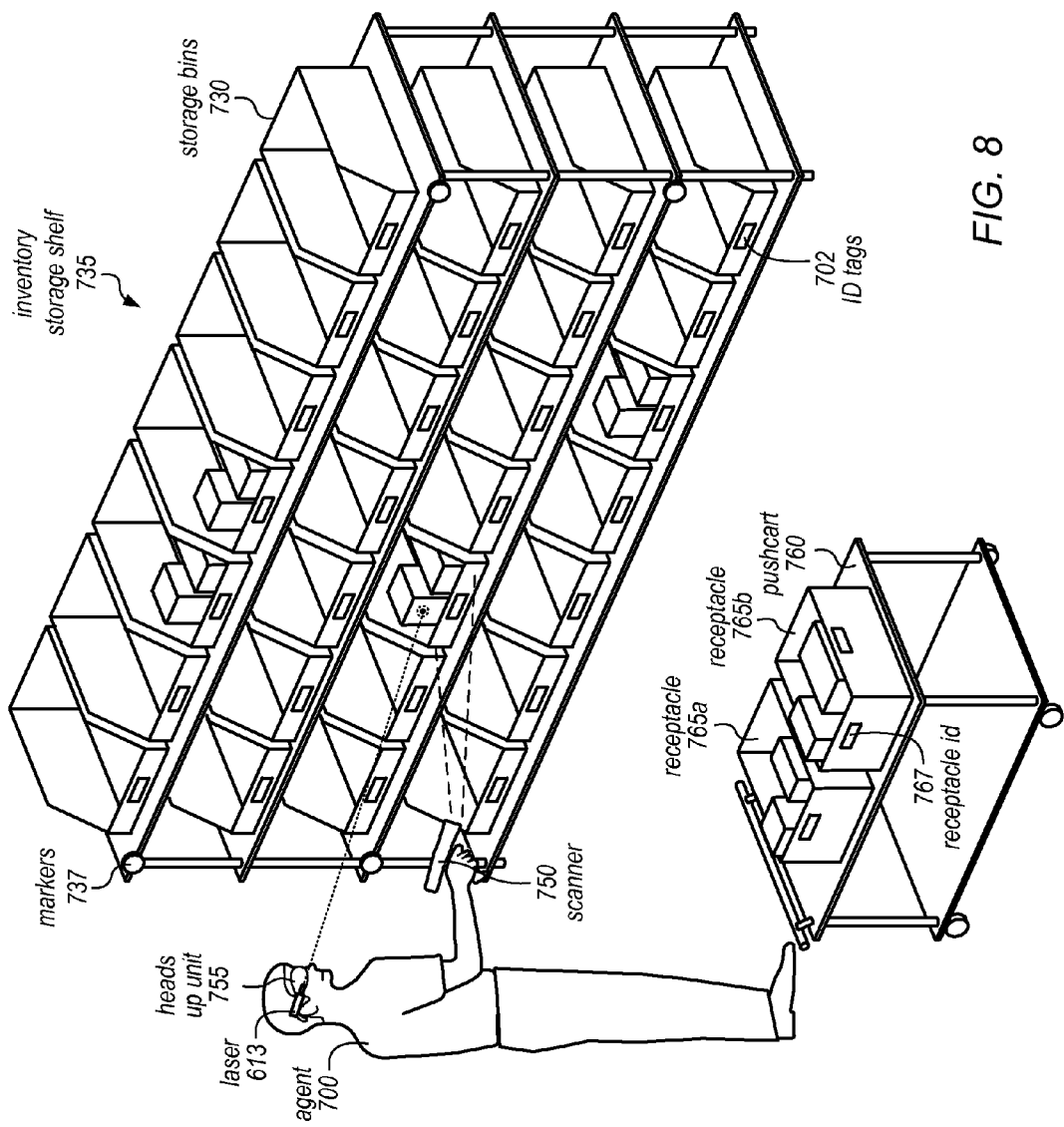
FIG. 8 is an illustration of a fulfillment center with stationary inventory locations, according to some embodiments.

While FIGS. 5A and 5B illustrate the use of a laser and image-enabled device 110, similar functionality may be achieved by using various combinations of laser and image-enabled device, laser and image-enabled display devices, laser and image-enabled capture devices, scanners and/or handheld communication devices in a stowing or picking operation as illustrated in FIG. 8, described below.

As described above, the information retrieved from data store 302 (e.g., stowing instructions 420), may be processed by control system 100 into various messages and communicated to laser and image-enabled device 110. In some embodiments, control system 100 and the laser and image-enabled device 110 may each be configured to communicate wirelessly, for example via radio communication or wireless networking, to convey instructions and information from control system 100 to laser and image-enabled device 110 for display to agents. In other embodiments, they may communicate via a wired connection protocol.

In embodiments in which the laser and image-enabled device 110 is configured to receive encoded location, position and/or descriptive information and to analyze or interpret it for display, the number of bytes required to transmit the location, position, and/or descriptive information may be small enough that attaching it to a message that is already being sent may be more efficient than the overhead required to send another message just for the additional information.

While several examples described herein involve the identification of items such as books, CDs, and DVDs, position information and/or descriptive information may be utilized with generally any kind of item, including, but not limited to electronic devices, clothing, toys, hardware, materials, and/or other items according to various embodiments. For example, position information and/or additional descriptive information (e.g., other than a title) may aid in identifying a book from among several books, as illustrated in inventory area 235, or in identifying a CD from among other CDs in inventory area 235, or a DVD from inventory area 235.

While the examples illustrated in FIGS. 5A and 5B include a data store 302, coupled to control system 100, in which location, position and/or descriptive information for items and inventory areas is stored, in another embodiment, control system 100 may access some or all of this information across a network from another device configured to store and provide such information (not shown).

FIG. 6 illustrates a process diagram of a method of using image-based position information about a unit of an item to direct light-based illumination at the position of the unit of the item such that a picker may readily recognize the particular unit of the item from among a plurality of units of heterogeneous items. All or some of the process may be performed by one or more devices, for example, a server and a laser and image-enabled device configured to implement the software modules illustrated in FIG. 4.

At 610, an item and an inventory location of a particular unit of the item may be selected. For example, control system 100 select a particular unit of an item from inventory to fulfill an entry in a pick list. At 620, one or more images of the inventory location comprising the selected unit of the item stowed among a plurality of heterogeneous items also stowed in the inventory location may be obtained. For example, a recent image of the inventory location (e.g., obtained during stowing of another unit of an item) may be obtained by image receiver 304 from data store 304. In some embodiments, an image of the inventory location may be received from a laser and image-enabled device while the device is at the inventory location just after the laser and image-enabled device captured the image.

At 630, the one or more images of the inventory location may be analyzed to determine a position of the unit of the item among the plurality of heterogeneous items stowed in the inventory location. For example, item image finder 312 may analyze the image of the inventory location to determine the position. At 640, instructions may be sent to illuminate, via light-based illumination, the determined position of the unit of the item in the inventory location among the plurality of heterogeneous items stowed in the inventory location. For example, item image finder 312 may send laser controller component 202 the position of the unit of the item and laser controller component 202 may send an instruction to a laser and image-enabled device 110 to illuminate the position. At 650, it may be determined whether more items are to be picked. For example, control system 100 may determine that all the items in a pick list have already been satisfied. If not, the process may return to 610 where another item and an associated inventory location of a particular unit of the item is determined. If so, the method moves to 660, where the picked items may be directed to the next station.

In some embodiments, the process illustrated at 630 may be performed by comparing before and after images of the inventory location when the stow of the unit of the item was performed. For example, image difference determiner 308 may retrieve the before and after images of the stow of the item from data store 302, perform a diff of the two images and determine the position of the unit of the item from the result of the diff. In some embodiments, the diff process may have been performed at the time of the stow or shortly thereafter and the position of the unit of the item may have been stored (e.g., in data store 302) at that time. In such a case, the position itself may be retrieved, for example, by item image finder 312 or directly by laser controller component 202.

Figure 7:
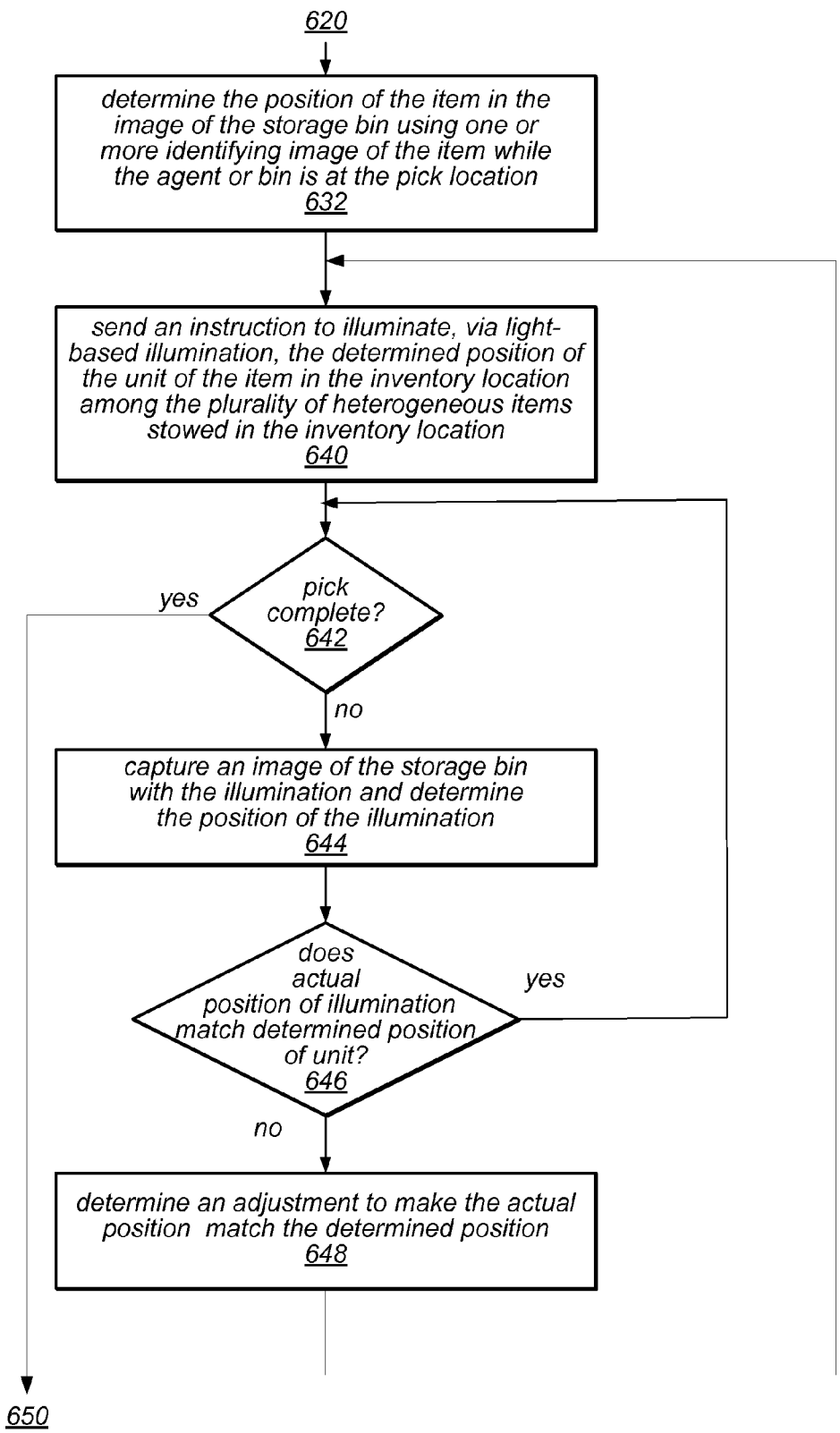
FIG. 7 illustrates a flow diagram of various item image analysis processes, according to different embodiments.

As illustrated in FIG. 7, in another embodiment, the process illustrated at 630 and 640 may be performed in real time with the pick process. For example, at step 620 in FIG. 6, an image of the inventory area where the agent is to pick the unit of the item may be obtained by laser and image-enabled device 110 while the agent or bin is at the pick location. At 632, the position of the item in the image of the storage bin may be determined using one or more identifying image of the item while the agent or bin is at the pick location. In some embodiments, item image finder 312 may compare an identifying image of the item to the image of the inventory area to determine the position of the unit of the item at the inventory location. At 640, an instruction may be sent (e.g. from control system 100, or laser controller component 202 to a laser and image-enabled device) to illuminate, via light-based illumination, the determined position of the unit of the item in the inventory location among the plurality of heterogeneous items stowed in the inventory location. At 642, it may be determined whether the pick is complete. For example, the agent may scan the picked item (e.g., with a laser and image-enabled device or a communication device or a scanner) to indicate the pick is complete. If the pick is complete, the process may move to 650, described above. If the pick is not complete, an image of the storage bin with the illumination may be captured and a determination of the position of the illumination may be performed, as at 644. For example, a laser and image-enabled device may capture an image of the storage bin with the illumination and send the image to item image component 200 where the item image finder 312 may analyze the image and determine the actual position of the illumination. At 646, it may be determined whether the actual position of illumination matches the determined position of the unit. In some embodiments, item image finder 312 may compare the actual position of the illumination with the determined position of the unit of the item to determine the match. If a match is found, the process may return to 642, described above. But, if a match is not found, an adjustment may be determined to make the actual position match the determined position. For example, item image finder 312 may determine a direction and distance to move the actual position so it is aligned with the determined position and may send the direction and distance to laser controller component 202. In another embodiment, item image finder 312 may update the determined position with a new position calculated to correct for the mismatch, for example, based on the image analysis. The process may then return to 640 as described above. For example, laser controller component 202 may send an instruction to the laser and image-enabled device to adjust the aim of the laser in the determined direction for the determined distance, at illustrated at 640.

Various embodiments disclosed herein may implement an image-based item unit position determination and laser pointer process for picking and stowing units of items in an inventory location of a fulfillment center. FIGS. 8 and 9 illustrate fulfillment centers with stationary and mobile inventory locations, respectively. Various processes may be carried out in the illustrated locations of FIGS. 8 and 9, for example, the processes illustrated in FIGS. 6, 7 and 10.

FIG. 8 is an illustration of a fulfillment center with stationary inventory locations (e.g., inventory storage shelf 735) with markers 737 and storage bins 730. FIG. 8 generally illustrates an agent 700 scanning one of the id tags 702 of one of the storage bins 730 and capturing an image of items in the storage bin. As illustrated, the agent 700 may either be stowing items from receptacles 765a-b of pushcart 760 to inventory storage bin 730 or picking items from inventory storage bin 730 and placing the picked items into receptacles 765a-b of pushcart 760. In some embodiments, a mobile laser and image-based device or multiple devices making up the laser and image-based device (e.g., one that travels along with an agent as he or she traverses the facility during picking and/or stowing operations such as a heads-up unit 755 and a scanner 750 may be used by agent 700 to determine the position of an item in an inventory location (e.g. storage bins 730) of inventory storage shelf 735. In various embodiments, the functionality described herein may be divided any number of ways between the scanner 750 and the heads up unit 755. For example, in some embodiments, the scanner 750 may not display images at all, instead relying upon the heads up unit 755 to display images of the items to be picked. In some embodiments, a heads up unit 755 may capture images of items in the inventory locations instead of or in addition to the scanner 750. For example, the scanner 750 may capture a close up image of the item when the id tag 702 is scanned, while the heads up unit 755 may capture an image of the item that includes more of the contextual imagery surrounding the item such as other items and a portion or the entire inventory storage shelf 735. In other embodiments, a single device may perform some or all of the disclosed functionality.

As illustrated in FIG. 8, an agent may use one or more display devices in a picking or stowing operation, in addition to one or more scanners 750. In this example, agent 700 carries scanner 750. This scanner 750 may be similar to image-based capture/display device 105 of FIG. 11, in some embodiments. For example, scanner 750 may be configured to receive picking or stowing instructions from a control system 100; to direct agent 700 to inventory storage shelf 735; to scan, enter, capture an image of or record information about a picked or stowed item; or to request and/or present additional information to agent 700 to help the agent locate an item or a particular storage bin of storage bins 730, in different embodiments.

As illustrated in FIG. 7, agent 700 may in some embodiments use a head-mounted display device 755 (also known as a head-up display) as a communication device, and this device may be configured for hands-free control. Such a display device may be configured to receive and display picking or stowing instructions, to direct agent 700 to inventory storage shelf 735, or to provide additional information to agent 700 to help him or her locate an item or a particular storage bin of storage bins 730, in different embodiments. In other embodiments, other types of head up display devices may be used (e.g., one implemented as a monocle on a headset or helmet) instead of, or in addition to, an image-based display system to display information and images of items sent from a control system in the facility. In some embodiments (not illustrated), various laser and image-enabled devices may be mounted to the ceiling, to the racks, etc.

In this example, receptacles, pushcarts, and/or inventory areas in the materials handling facility may be equipped with ID tags 702 (e.g., RFID tags). Each ID tag 702 in the materials handling facility may include a unique identifier that uniquely identifies the ID tag at least within the materials handling facility. The location of each receptacle or other asset within a materials handling facility to which an ID tag is attached, and/or other information relevant to the receptacle or other equipment to which the ID tag is attached, may be associated with the unique identifier of the ID tag and stored such that it is accessible by a control system in the facility. Agents within the materials handling facility may be equipped with ID readers, which may be integrated in or attached to gloves, wristbands, or other devices worn or carried by agents. The location of each receptacle to which an ID tag 702 is attached may be associated with a unique identifier of the ID tag.

FIG. 9 illustrates a fulfillment center with mobile inventory locations 804 that are moved to and from station 808 by mobile drive unit 802, according to some embodiments. In some embodiments, the illustrated station may be configured to carry out the processes illustrated herein (e.g., FIGS. 6, 7 and 10). For example, stationary station 808 may be manned by agent 814 holding scanner 816. Station 808 may be equipped with image capture device 806 and laser device 607 that may each function separate from or in cooperation with scanner 816. In some embodiments, the devices may be coordinated by messages to and from control system 100. Generally, an agent may receive instructions from scanner 816 or a display 810 to stow or pick items to or from the storage bins 730 of mobile inventory location 804. Laser device 607 may illuminate the position of the item to be picked with laser beam 609 and image capture device 806 may capture images within the image capture area 107 before, during or after the picking (or stowing) process. The agent may place or induct the picked item(s) onto a conveyance mechanism 812. In some embodiments, items are individually inducted into receptacles 765 that are placed on the conveyance mechanism 812.

In some embodiments, a laser and image-enabled device (e.g. image capture device 806) may capture images of items on mobile inventory location 804, for example when an item is picked from or stowed to a storage bin 730 of mobile inventory location 804. In some embodiments, an image may be captured by image capture device 806 when the agent scans an ID for one of storage bins 730, for example, whenever an item is picked or stowed.

As previously noted, in some embodiments, a laser and image-enabled system may be used in conjunction with other communication devices, such as handheld communication devices. For example, as described below, FIG. 9 illustrates one embodiment in which control system 100 communicates some information to laser-device 607 and other information to a communication device (e.g., display 810 or scanner 816). In this example, picking/stowing instructions (e.g., pick lists or lists of items to be stowed) may be sent to display 810, while location, position, and/or descriptive information 930 and projection instructions may be sent to one or more laser and image-enabled devices. In other embodiments, information sent to one or the other of a laser and image-enabled device and communication device may be partitioned differently or may be partitioned on a context-sensitive basis. For example, in one embodiment, control system 100 may determine whether to use a laser and image-enabled device or a communication device to present information for a given stowing or picking operation dependent on which agent is performing the operation, or this may be selectable by the agent. In another embodiment, control system 100 may determine whether to use a laser and image-enabled device or a communication device to present information for a given stowing or picking operation dependent on the number or type of items to be picked or stowed, on the number of agents working in close proximity in inventory, on the configuration of a section of the inventory in which the targeted inventory area is located, or using other criteria.

In some embodiments, scanning an identifier of a nearby inventory area may be performed as part of the normal picking and stowing operations to identify to the control system the inventory area from which an item was picked or the inventory area into which an item was placed.

Other arrangements of materials handling facilities are contemplated in addition to those illustrated in FIGS. 8 and 9. The methods, devices and systems described may be applicable to the other configurations as well. For example, a fulfillment center may be arranged such that a conveyor runs past stationary inventory shelves and items are picked from the inventory shelves and placed directly on the conveyor. It is contemplated that laser illumination of the items to be picked may be applied is such a fulfillment center configuration.

Calibration of laser and image-enabled devices may in some embodiments involve placing markers (e.g., markers 737) in an inventory area (e.g., on a shelving unit) identifying the location of the inventory area itself, and/or a particular position within the inventory area. In such embodiments, the nearest laser and image-enabled device may be directed to sweep a laser beam across the area and the reflection of the beam from each marker (e.g., from reflective stickers or bar codes on each marker) may be detected by a fixed-location camera. The orientation and/or display angle of the laser and image-enabled device at the time the reflection was detected may be stored and used by a control system to point to a particular position within the inventory area. For example, markers may be placed on the far right and far left edges of each shelf in an inventory area, and the orientation and/or display angle of the nearest laser and image-enabled device when pointing at each of the markers may be stored along with an identifier of the marker, and location/position information for the marker (e.g., an identifier of the inventory area or of an individual shelf, bin, etc.). The control system may then calculate what the orientation and/or display angle of the laser and image-enabled device should be in order to project a laser beam at a particular item or position on one of the shelves by extrapolating the position of the item with respect to the stored marker information and stored location/position information for the item (e.g., an identifier of the inventory area in which it is stored and an indication of its position within the inventory area). In another embodiment, a scanner or image capture device may be used to capture marker information as a laser beam is swept across an inventory area during a calibration operation. In general, any combination of laser and image-enabled devices, cameras, and/or scanners may be used in automatically calibrating the laser and image-enabled devices to the inventory areas and/or their contents.

In one embodiment, a more manual calibration operation may be performed, such as one in which an agent manipulates the orientation and/or display angle of a laser and image-enabled device until it is pointed to a particular inventory area, marker, or item, and then causes the orientation and/or display angle to be captured and stored along with an identifier of the laser and image-enabled device, inventory area, marker, and/or item (e.g., by pressing a button on a remote control device for the laser and image-enabled device and scanning or entering one or more identifiers to be associated with the current location, orientation, and/or display angle of the laser and image-enabled device).

In some embodiments, using one of the calibration techniques describe above, or another calibration technique, the location and position of each laser and image-enabled device with respect to the inventory areas, shelves, bins, pallets, and/or items may be determined and stored along with identifying information. This information may be accessed by a control system and used to direct an agent to a particular inventory area and/or position within an inventory area to stow or pick items using a laser and image-enabled system, as described herein, or a combination of a laser and image-enabled systems and other communication devices and methods.

As can be seen from the examples illustrated in FIGS. 1, 5A and 5B, 6, 7, 8 and 9, various combinations of fixed-location laser and image-enabled devices and portable laser and image-enabled devices may be used to capture and display images of items in various inventory locations for the facility. The selection of devices and/or combinations of devices to be used in a given facility may be dependent on a variety of factors, including, but not limited to: the area that can be covered by each type of laser and image-enabled device, the total area of the facility to be covered, safety issues (e.g., issues involving the brightness and/or power of the displays and lasers, and the availability and use of safety goggles), the supported angles of displays and lasers (e.g., ceiling-mounted laser and image-enabled devices might not be suitable for a facility with 30-foot high ceilings and 3-foot wide aisles), or the complexity of the signals supported (and thus of the complexity of devices that may be achievable).

As described above, the control system in a materials handling facility may be configured to send all of the information needed for a picking or stowing operation to a laser and image-enabled device at the same time (e.g., at the beginning of the operation) or may be configured to send information to the laser and image-enabled system on a just-in-time or as-needed basis, dependent on the location of an agent performing the operation and on the status of the operation in progress, in different embodiments. In one such embodiment, a communication device or indirect asset tracking device may be connected to a proximity awareness system and may thus be configured to automatically request position and/or descriptive information when the agent is approaching the proper inventory area. Thus, the communication device, laser and image-enabled device, control system, and/or a proximity awareness system may be configured to coordinate their functions such that an agent receives the information (e.g., through a laser and image-enabled device near the agent) when it is needed, thus mitigating the time the agent waits for the information to be received and presented.

The amount and/or type of information supplied to an agent using a laser and image-enabled device may vary from item to item based upon various optimization rules, according to certain embodiments. For instance, the control system or item image component may include a set of rules, heuristics, or polices that determine the amount and type of information needed to locate, identify, or distinguish an item with at least a certain level of confidence. In some embodiments, the control system or item image component may be configured to perform various types of analysis, possibly in conjunction with optimization rules or policies, in order to determine the amount and/or type of information that should be provided when picking a particular item. Thus, in some embodiments, rather than always sending all the information available for an item, only a minimum amount of information, such as determined by optimization rules, heuristics or policies, may be initially provided to picking agents.

FIG. 10 illustrates a flow diagram of an identifying item image capture, determination and linking process. The process illustrated in FIG. 10 may be performed in materials handling facilities such as those depicted in FIGS. 8 and 9, described above. In some embodiments, any time a single item is added or removed from inventory, a before and after image may be captured and processed as illustrated in FIG. 10. Although, in one embodiment, only after images are used. For example, one after image of another item being picked or stowed in the same inventory location may be used as the before image for another item that is later picked from the same inventory location. As long as no other items were picked or stowed from the inventory location in-between, a diff of the after image from the other item and the after image from the pick or stow of the more recent item should provide an image of the more recent item as the item appeared in the inventory location. Such a process may eliminate the need for capturing both a before and after image for any particular pick or stow action. In some embodiments, the item image component 200 or the control system may be configured to operate regularly in a mode where both before and after images are captured during each pick or stow operation, such as when an inventory location is scanned, for example. In other embodiments, the item image component 200 or the control system may be configured to selectively direct capture of either before or after images during any particular pick or stow operation, perhaps based on whenever an image already exists, for example. In yet another embodiment, the item image component 200 or the control system may be configured to regularly capture after images only during pick or only during stow operations. The item image component 200 or the control system may be configured to stop capturing item images of a particular item after an identifying image of the particular item has been selected or may be configured to start capturing images of particular items when packaging for the item has changed.

Continuing with FIG. 10, at 1010, a before image of a storage bin before a unit of an item is stowed to or picked from the storage bin may be received. For example, an image capture device 105 may capture a before image of a storage bin before an agent stows or picks an item and send the captured image to data store 302 via item image component 200. At 1020, an after image of the storage bin after the unit of the item is stowed to or picked from the storage bin may be received. For example, an image capture device 105 may capture an after image of a storage bin after an agent stows or picks an item and may send the captured image to data store 302 via item image component 200. In either case, image receiver 304 may receive any or all of the images and transfer the images to data store 302. At 1030, an image of the unit of the item may be determined based on a comparison of the before and after images. For example, image perspective-dimensioner may access the before and after images from data store 302 or from image receiver 304 directly, and may process either or both of the received before and after images such that image difference determiner 308 may perform a diff of the before and after images. The difference between the before and after images may be an image of the item that was stowed or picked.

At 1040, one or more analysis techniques to select identifying image(s) from the determined item image(s) may be applied. For example, identifying image selector 310 may analyze the item images of an item with relatively simple image analysis such as comparative image quality among multiple images of the item or some threshold measure of image quality, or image selector may analyze the item images using machine learning techniques. As illustrated at 1050, if a minimum confidence level of the identifying image is not reached, the process may return to receiving before and after images at 1010 and 1020. In some embodiments, a minimum confidence level may be configurable or based upon a simple threshold number of available item images, while in other embodiments, a minimum confidence level may be based upon machine learning techniques, such as those that refine and improve the selected identifying image of the item over time. If a minimum confidence level of the identifying image is reached, identifying item image(s) may be linked with the item, as illustrated at 1060. For example, if the item is stored in inventory in a six-sided box, the system may be configured to select 6 representative images of the item, one for each side of the box. As such, the system may be more likely to recognize the item in an image no matter which side of the box appears in the image of the inventory location image. The selected identifying image(s) may be linked to the item in any number of ways readily recognizable to one of ordinary skill in the art (e.g. a database entry or the like).

Figure 11A:
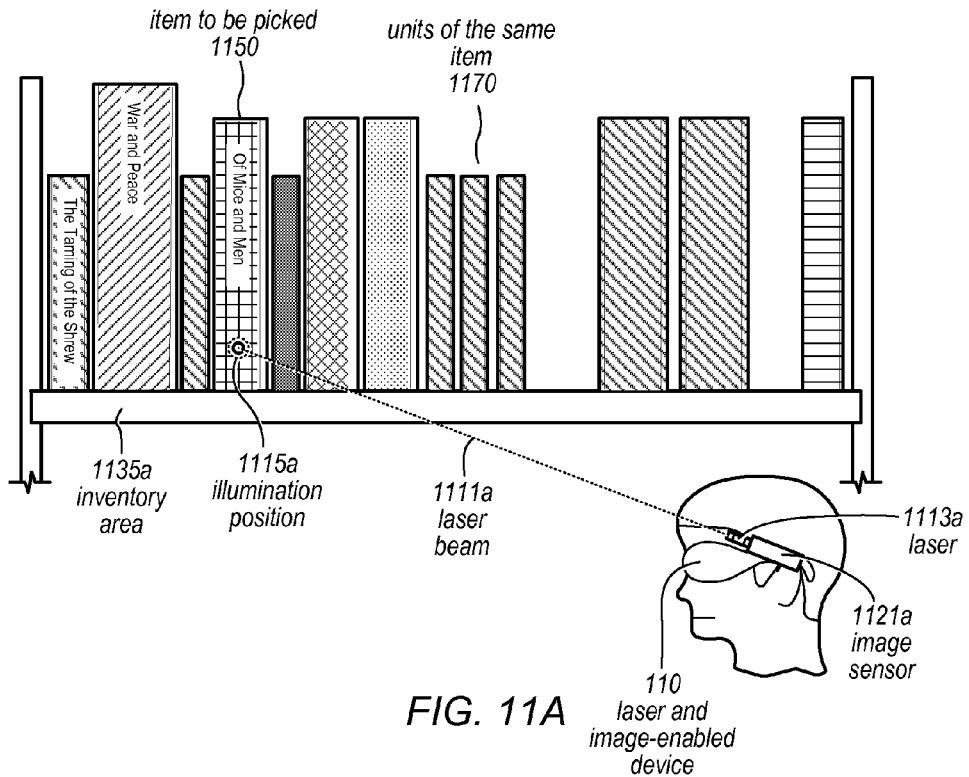
FIGS. 11A-11B illustrate examples of laser and image-enabled devices during picking and stowing, according to some embodiments.

FIG. 11A illustrates a head up unit as a laser and image-enabled device 110. For convenience and as used herein, an laser and image-enabled device may be referred to as a laser and image-enabled capture device, a laser and image-enabled display device, a display device, a capture device, a laser and image-enabled system or simply, a device. Laser and image-enabled device 110 may, in various embodiments, be configured to receive encoded program instructions, text files, graphics files, and/or image data from control system 100.

Laser and image-enabled device 110 may be configured to perform as a communication device that performs various of the communication functions described here. However, the communication features may also be performed with a communication device that does not include all of or only includes some of the laser and image-enabled features described herein. Furthermore, scanners may also be configured with or without one or more of the communication and image capabilities disclosed herein.

The devices (e.g., handheld, handheld display, heads-up display, stationary display, scanners, display scanners, etc.) employed in a materials handling facility may utilize any of various known image capture, image display and laser projection technologies. In some embodiments, the image capture, display devices, lasers and/or control system may be coupled to one or more sensors, scanners, RFID readers, or cameras usable for various functionality (e.g., determining the locations of the device, and perhaps thereby determining the location of the agent) in the facility with respect to one or more references within the facility whose locations are known). The control system may also be coupled to a product database or other data store configured to store respective location and image information associated with each item handled within the facility to a data store. The location information for each item may indicate a location at which the item is or was stowed or a location at which the item is to be stowed (e.g., the location at which the control system determines it should be stowed). In some embodiments, the control system may be configured to access the stored location information for a given item when determining the targeted inventory area for picking or when determining a path to the targeted inventory area for picking. Such a product database may also be configured to store position and/or descriptive information such as item images for example, which may be accessed by the control system and used to generate the various guidance messages, item images and item position information to be sent to the devices. However, in some embodiments, item images may be stored separately from the position and/or descriptive information. In some embodiments, labels or other indicia in the storage area may be captured in the images and used to determine the position or location. Item locations and item images including or excluding contextual storage location images may be gathered. Images may be captured at the same time (e.g., during scanning while stowing or picking) or gathered separately from the location information.

One or more image capture devices (e.g. laser and image-enabled devices) may orient themselves with regard to positioning suitable for image capture. For example, an image capture device mounted at a position near a work station that receives moving storage bins may orient itself toward a particular portion of the storage bin where the item to be picked or stowed is located within the storage bin. Such orientation may be performed in conjunction with markers on the storage bin that indicate location and/or size. Indications of size and location may be used during image processing and/or comparison. Alternatively, an image capture sensor mounted on a scanner device for example, may use various mechanical mechanisms to orient itself with regard to where the item is expected to be at the time of image capture. For example, the device or system may be configured to recognize that some storage bins in an area store items above a storage bin id while other storage bins store items below a storage bin id. The device may orient the image sensor to capture the image of the item and the storage bin accordingly. Alternatively, the device may comprise multiple image sensors to capture the image of the item and storage bin.

In some embodiments, software drivers for displaying received text, graphics, and/or image files may be executed by processors on the various image-based capture/display devices 105. For example, various image-based capture/display devices 105 may be configured to accept and display information received in one of several vector graphics formats or raster graphics formats, such as a Microsoft Windows bitmap (BMP), computer graphics metafile (CGM), graphic interchange format (GIF), PC Paintbrush format (PCX), JPEG file interchange format (JPEG), tagged image file format (TIFF), scalable vector graphic (SVG), Microsoft Windows media format (WMF), progressive graphics file (PGF), raw image format, portable network graphics (PNG), HD Photo (HDP), X Pixmap (XPM), Multiresolution Seamless Image Database (MrSID), and/or other formats.

A materials handling facility may, in various embodiments, include different arrangements of fixed-location and/or movable laser and image-enabled device 110. For example, in some embodiments, an array of such devices may be mounted on the ceiling of the facility, and/or a series of such devices may be mounted on walls, floors, poles, or shelving units within the facility. These laser and image-enabled device 110 may be networked together (e.g., wirelessly or by wire) and/or configured to communicate with a control system, such as to receive messages from the control system that include instructions executable to initiate displaying location information, position information, descriptive information, item images, storage location images and/or path information to agents within the facility. The laser and image-enabled device 110 may also be configured to receive messages from a control system or from an agent (e.g., via a handheld remote control device) including instructions executable to alter their position (e.g., their orientation and/or angle). For example, a laser and image-enabled device may be directed to rotate, sweep, or point in a particular direction in order to capture an image of an item. Some laser and image-enabled device may implement both image capture, image display and laser projection functionality. Other image-based capture and/or display devices may implement some subset of image capture functionality, laser projection functionality, communication functionality or image display functionality.

Once a picking agent has reached the inventory area the agent was directed to, a laser and image-enabled device 110 may display (or project) additional visual guidance for identifying and/or locating the particular item to be picked. For example, the laser and image-enabled device 110 may display an image of the item or an image of the item as the item appears in the inventory location, a symbol or icon representing an item's position, or any other information suitable for identifying, highlighting or locating the item to be picked. In some embodiments, the control system may store position and dimension information for some or all of the items stowed in the inventory area, and an image-based display device may be programmed to display an image of the position or dimension of the items based on the position or dimension information stored by the control system. Alternatively, the item's position or dimension may be determined based on the dimensions (e.g., width) and/or the relative positions of the other items in the inventory area. For example, if analysis of an image of the item in an inventory area determined the item be the 3rd item from the left on a particular shelf and to be 3 inches wide, and the first two items in the image are analyzed and determined to be 2 inches wide and 1 inch wide, respectively, the laser and image-enabled device 110 may be programmed to display a highlighted image of the position or illuminate the actual position between 3 and 6 inches from the left edge of the shelf in the image of the inventory location, where the item should be located. One of ordinary skill in the art will recognize many other ways to make the position of the item stand out from the rest of the inventory area in the displayed image. For example, an arrow may be displayed as pointing to the item, a translucent overlay in some contrasting color may overlay on top of the actual image of the item in the image of the inventory location, or the edges of the item may be overlaid with a dotted line, etc.)

Figure 11B:
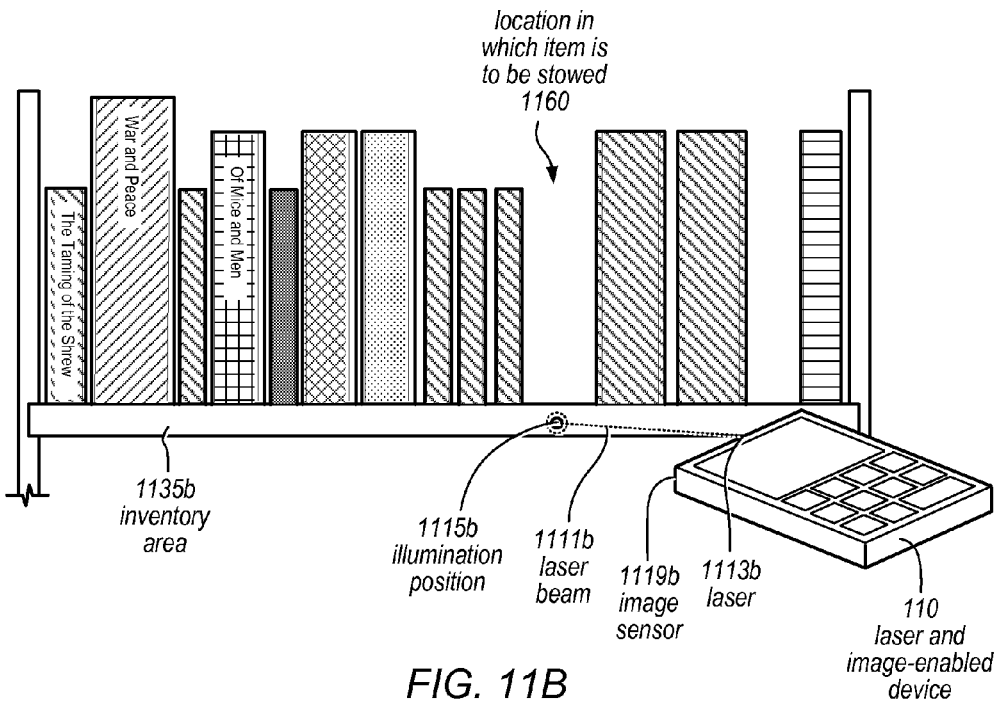

FIGS. 11A and 11B illustrate the use of a laser and image-enabled device in picking and stowing, respectively, according to one embodiment. FIGS. 11A and 11B illustrate a laser illuminating a particular position in an inventory area (e.g., a storage bin). FIG. 11A illustrates laser 1113a illuminating the item to be picked 1150, but the system describes herein may, in some embodiments, be configured to illuminate any one of the other books in inventory area 1135a. Similarly, FIG. 11b illustrates laser 1113b illuminating a position below a location in which an item is to be stowed 1160, but in some embodiments, the system described herein may be configured to illuminate any other available position in inventory area 1135b. Various mechanical mechanisms (e.g., mirror based) may be used by either or laser and image-enabled devices 110 to point the laser or adjust the position the laser is pointed towards, for example, when a head-mounted laser and image-enabled device 110 is moved as the person moves.

FIG. 11A, illustrates identification of item 1150 (the book, Of Mice and Men) within inventory area 1135a. In this example, a laser and image-enabled device 110 is directed by a control system (not shown) to project a laser beam 1111a at item 1150. As noted above, in some embodiments the control system may determine where the beam should be projected (e.g., the orientation of laser and image-enabled device 110, and the direction and angle of a laser beam projected by the device), dependent on the position of the laser and image-enabled device 110 and on stored position and dimension information for item 1150 and the other items in inventory area 1135a. In this example, laser and image-enabled device 110 may be a fixed-location laser and image-enabled device or may be a mobile device whose location and position/orientation have been determined through calibration, as described above. As previously noted, in some embodiments, the color of a laser beam used to identify a particular item may be specific to a particular picking agent, a customer order, or another item grouping. For example, in one embodiment, a picking agent may be picking items for multiple orders or item groupings and may be placing items in different totes or receptacles depending on the order or group to which the items belong. In this example, the color of the laser beam used to identify an item may match the color of the tote or receptacle (or an identifier on the tote or receptacle) in which the item should be placed. In another example, two picking agents may be picking items in the same inventory area (or in nearby inventory areas), and each agent may be able to locate the item(s) he or she should pick based on the color of the laser beam used to identify them (e.g., using a different colored beam for each agent).

Item 1170 illustrates units of the same item, for example, three units of the same book. In some embodiments, one or more modules of the control system may be configured with logic to select a particular one of the three units to illuminate. In some embodiments, the logic may be based upon pick rules from pick etiquette. In other embodiments, the logic may be based upon local custom, for example, selecting the first item from the left or the first item from the right or randomly. In yet other embodiments, the logic may be based upon expiration dates (not illustrated). For example, various items, such as dry goods or milk may have an expiration date associated with the item. The logic may be configured to determine the expiration date associated with the item, for example, from image analysis of an expiration date found on the item in the image of the item or from a stored expiration date associated with the item and stored in data store 302.

FIG. 11B illustrates identification of a position in inventory area 1135b at which an item (e.g., another book) should be stowed, according to one embodiment. As illustrated in FIG. 11B, a laser beam displayed by laser and image-enabled device 110 is directed to a location 1160 in inventory 1135b. In this example, a control system may have determined that the item should be stored in location 1160 based on positional placement guidelines, on guidelines based on the item being readily distinguishable from other items in inventory area 1135b, on guidelines for random or pseudo-random placement of items in the facility, or by other means. The control system may then have determined the position where a laser beam should be pointed (e.g., the orientation of laser and image-enabled device 110, and the direction and angle of a laser beam displayed by the device), dependent on the position of the laser and image-enabled device and on stored position and dimension information for the other items in inventory area 1135*a* and on dimension information for the item to be stowed. As in the example illustrated by FIG. 11A, laser and image-enabled device 110 may be a fixed-location laser and image-enabled device or may be a mobile device whose location and position/orientation have been determined through calibration, as described above. Also as previously noted, in some embodiments, the color of a laser beam used to point to a particular position in an inventory may be specific to a particular picking agent, e.g., when two or more agents are stowing items in the same inventory area or in nearby inventory areas.

In some embodiments, the inventory locations (e.g., storage bins) may not have defined positions within the inventory location. In other embodiments, the inventory locations have predefined positions within the inventory location (e.g., slot A of slots A-D or position 1 of positions 1-10 of the storage bin). In such embodiments, the position that the item is to be stowed to or picked from may or may not be determined based upon the predefined positions within the inventory location.

As illustrated in FIG. 11, image-based capture/display device 105 may display via display 1106, inventory location 1100 that stores book 1102. As illustrated on the display 1106, book 1102 may be outlined with outline 1104 in order to highlight the position of the item to be picked. Additionally, or as an alternative example, icon 1110 may point to the item to be picked. Other forms of highlighting will be recognized by one of skill in the art and are contemplated and may be applied without departing from the scope of the invention disclosed herein.

Lasers may be associated with eye injuries. For example, when a laser is directed at an eye or when an eye moves into the beam of a laser, the eye may be damaged. In some embodiments, an eye avoidance module may be configured to recognize opportunities for a laser beam and an eye to come into contact and to control the laser such that contact between the laser beam and an eye is avoided. For example, an eye avoidance module may be configured to receive or monitor images of an area near-to or in the vicinity of a laser or areas than can be subject to a laser beam from a laser. The eye avoidance module may be configured to perform facial recognition on the received or monitored images. In some embodiments, if a facial feature is recognized in the received or monitored images, an alert may be generated and sent. For example, when a facial feature is recognized, the eye avoidance module may send a message to the laser controller component 202, item image component 200, laser and image-enabled device 110, a communications device (e.g., scanner 816, or heads up unit 755), although the message may be sent elsewhere as well, for example to a record-keeping facility that maintains records of eye-laser near misses, etc.

Instead of, or in addition to sending a message, an instruction may be sent to any of the same devices, or another device, instructing the device to avoid contact between the laser and the face associated with the recognized facial feature. For example, an instruction may be sent to discontinue projection of the laser from the laser device or to project the laser away from the face associated with the recognized facial feature. In some embodiments, the laser and image-enabled device may recognize the facial feature and avoid contact between the eye and the laser beam. In some embodiments, one or more components or module of the control system may recognize the facial feature and send an instruction to a laser-enabled device to avoid contact between the eye and the laser beam. Other configurations of the system are contemplated and one or more of the components and devices of the system may share various of the functionality described herein. The eye avoidance module may run as a continuous or semi-continuous process, continuously monitoring images for facial features.

In general, various combinations of fixed-location devices (e.g., laser and image-enabled devices, scanners and/or cameras mounted at fixed locations within a facility) and mobile devices (e.g., laser and image-enabled device, scanners, and/or cameras carried or mounted on movable components within the facility) may be used in conjunction with various markers, RFID tags, or other identifiers of agents, items, pushcarts, and/or inventory areas to determine and track the location, position and/or orientation of agents and pushcarts (or other containers used to transport items) within the facility. For example, in one embodiment, one or more laser and image-enabled devices mounted on a ceiling may direct an agent to a particular inventory area, and then a mobile laser and image-enabled device may project additional information for locating a particular storage position or item within the inventory area. In another example, a mobile laser and image-enabled device (e.g., mounted on an agent's pushcart) may direct an agent to an inventory area and then a fixed-location laser and image-enabled device targeted to that area may be used to identify a particular position or item within the area. In another example, ceiling-mounted laser and image-enabled devices may be used to identify individual inventory positions or individual items on high shelves, or to illuminate whole inventory areas (e.g., pallets), while fixed-location laser and image-enabled devices mounted in lower positions (e.g., those mounted on the wall, floor, or a low shelf) or mobile laser and image-enabled devices may be used to identify individual inventory positions or individual items on low shelves or in tight corners. In any of these embodiments, fixed-location cameras or scanners may be used to determine and/or track the location of the agent and/or the agent's pushcart as they traverse the facility. For example, in one embodiment a camera or scanner at a fixed location may be configured to use face or pattern recognition to determine an agent's location (e.g., by scanning a marker or other identifier on a hat, badge, shoulder strap, pushcart, etc.). In another embodiment, an agent's current location may be determined by triangulating information received from two or more scanners or sensors of fixed position (or currently known location) in the materials handling facility. For example, information received from two scanners or sensors that detect the presence of the agent may include the distance from each of the scanners or sensors to the agent and the angle of the scanner or sensor when the agent is detected.

In one embodiment, each time an agent stops at a particular inventory area to pick or stow an item, an identifier associated with the inventory area may be captured by a mobile laser and image-enabled device, scanner, or camera (e.g., by scanning a marker or detecting a signal from an RFID tag). If two or more identifiers are scanned or detected, the control system may in some embodiments be capable of determining both the location and position/orientation of the agent (or his or her pushcart). Using this information, the control system may be able to direct a mobile laser and image-enabled (e.g., one mounted on the agent's pushcart or heads up unit) to project a laser beam at a particular position within an inventory area or at a particular item within the inventory area. In such embodiments, the control system may access position and/or dimension information associated with an item to be picked in order to determine where to project the laser beam from a mobile laser and image-enabled device so that it will point to the item to be picked.

In some embodiments, instead of a laser illuminating the position, an array of lights may be configured at the inventory location so as to denote particular positions within the inventory location. For example, the storage bin itself may have a plurality of lights and may be configured such that a particular one of the lights is illuminated to indicate the position of the item from among plural possible positions within the storage bin. In some embodiments a light on the left of the storage bin may be illuminated to indicate that the unit of the item is positioned on the left of the storage bin, for example. Other lights may be arranged in the center or to the right in the storage bin, in some embodiments. Which particular light is illuminated may be determined by the image analysis described herein.

Many of the operations illustrated by the flowcharts in FIGS. 6, 9, 10A-B and 13 may be suitable for automation, according to various embodiments. The amount of automation may vary from embodiment to embodiment. For example, in one embodiment, the entire receiving and stowing process may be completely automated using various conveying and scanning means to move the item within the facility and associate position and/or descriptive information with the item. In one such embodiment, software executing on a control system, such as control system 100, may be configured to automatically capture item images and associate the item images with the item based upon an automated identification of the item, such as through the automated scanning of a bar-code, and may store the item image in a product database, such as data store 302. The software may also be configured to automatically determine one or more inventory areas in which to store the item such that the item may be easily distinguishable based on characteristics of the item image, and the characteristics of other co-located items with item images, and may store an identifier of the inventory area in data store 302. In some embodiments, the software may also be configured to determine the item's position within the inventory area, based on positional placement guidelines followed by automated stowing means or by automatically capturing the position of the item using automated means such as the techniques described herein, for example. The software may then associate a position indicator with the item. In one embodiment, dimension information may be automatically determined and/or estimated for each item by the control system and/or the item image component 200 and may be associated with the item in the product database or datastore 302.

In embodiments in which various steps of a stowing operation are automated, agents may still use a laser and image-enabled system in a manual or semi-automated picking operation. For example, in one embodiment, pick lists may be automatically generated by control system 100. Similarly, control system 100 may be configured to automatically determine the location of one or more agents within the facility, a targeted inventory area for a picking operation, a path from the current location of the picking agent to the targeted inventory area, and position and/or descriptive information associated with an item such as an item image or inventory location image to be displayed by a laser and image-enabled device. Control system 100 may then generate and send messages to a laser and image-enabled system to direct an agent in the picking operation, as described herein. Control system 100 may also be configured to automatically track the location of the picking agent and the progress of the picking operation, using scanners, cameras, or other communication devices configured to automatically detect identifiers of agents, items, and/or other components in the facility.

Although many of the examples described herein involve the use of a laser and image-enabled system in picking and/or stowing operations of a materials handling facility, a laser and image-enabled system may also be used in other operations within the facility. For example, in a sorting or packing operation, the control system may be configured to send data to a laser and image-enabled device to display an image of an inventory location or project a laser to identify a bin, tote, shelf, or station to which one or more items should be transferred, a recommended container for a group of items, a hopper into which one or more items should be placed, a conveyor belt on which one or more items should be placed, or a slot through which one or more items should be passed. In another example, in a shipping operation, the control system may be configured to send data to a laser and image-enabled device to initiate display of an image or projection of a laser to identify a shipping lane (e.g., one associated with a particular carrier, truck, or set of zip codes associated with a shipment), or to identify a pallet or container to which items or item packages should be transferred for shipping. In yet another example, in a receiving operation, the control system may be configured to send data to an image-based display device to display an image or project a laser to identify the next box to process (e.g., by displaying a carton to be opened), based on information captured by a camera, scanner, or other sensing device. Other similar uses of an image-based display system in a materials handling facility are contemplated. The displayed images of various areas of the materials handling facility that are not inventory areas may have been captured prior to display and may have been captured as part of regular operations of the facility, such as when a pallet is moved for example, or may be have been captured as a particular image capture process specifically for this purpose.

Figure 12:
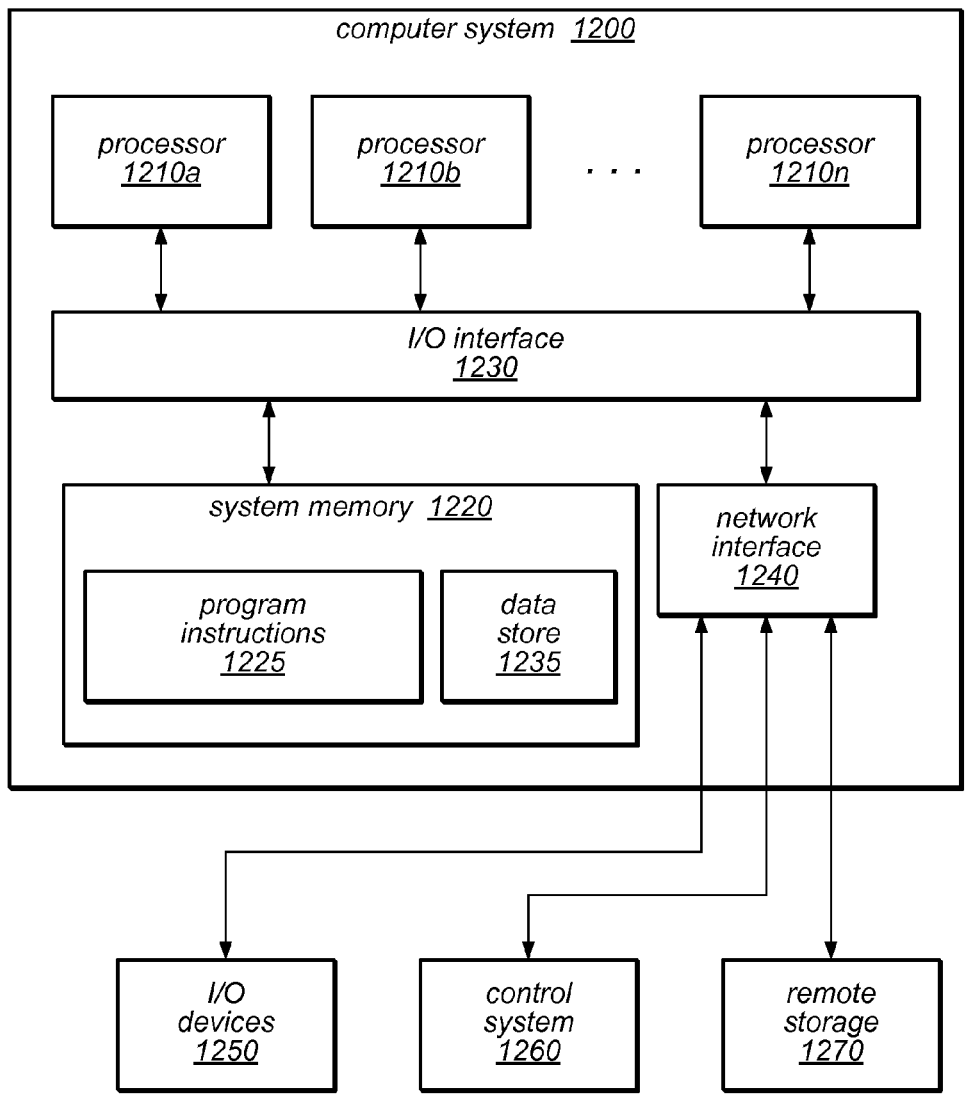
FIG. 12 is a block diagram illustrating a computer system suitable for use in a materials handling facility that employs an image-based display, according to one embodiment.

Any of various computer systems may be configured to implement the use of an image-based display system within a materials handling facility. For example, FIG. 12 is a block diagram illustrating one embodiment of a computer system suitable for implementing the system and methods described herein. In various embodiments, an order fulfillment control system (e.g., control system 100 of FIGS. 1, 5A and 5B), a laser and image-enabled device (e.g., a laser and image-enabled device 110 of FIGS. 1, 5A and 5B, 8 and 9, 11A and 11B), or a communication device (e.g., scanner 816 illustrated in FIG. 8), may each include a general-purpose computer system such as computer system 1200 illustrated in FIG. 12.

In the illustrated embodiment, computer system 1200 includes one or more processors 1210 coupled to a system memory 1220 via an input/output (I/O) interface 1230. Computer system 1200 further includes a network interface 1240 coupled to I/O interface 1230. In some embodiments, computer system 1200 may be illustrative of control system 100, while in other embodiments control system 100 may include more, fewer, or different elements than computer system 1200. In some embodiments, computer system 1200 may be illustrative of an image-based display system, a laser and image-enabled device, or a communication device while in other embodiments a laser and image-enabled system, laser and image-enabled device, or communication device may include more, fewer, or different elements than computer system 1200.

In various embodiments, computer system 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA.

System memory 1220 may be configured to store instructions and data accessible by processor 1210. In various embodiments, system memory 1220 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above for an order fulfillment control system, a laser and image-enabled system, or a communication device, are shown stored within system memory 1220 as program instructions 1225. In some embodiments, system memory 1220 may include product database 1235, which may be configured as described herein (e.g., data store 302). In other embodiments, remote storage 1270 may include a product database instead of, or in addition to, system memory 1220. For example, the information described herein as being stored in a product database may be partitioned between a database included in system memory 1220 and one or more databases included on one or more remote storage devices 1270, in various embodiments.

In one embodiment, I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

Network interface 1240 may be configured to allow data to be exchanged between computer system 1200 and other devices attached to a network, such as other computer systems, for example. In particular, network interface 1240 may be configured to allow communication between computer system 1200 and various I/O devices 1250, control system 1260, and/or remote storage 1270. I/O devices 1450 may include laser and image-enabled devices making up a laser and image-enabled system and/or other communication devices, as described herein. Network interface 1240 may commonly support one or more wireless networking protocols (e.g., Wi-Fi/IEEE 802.11, or another wireless networking standard). However, in various embodiments, network interface 1240 may support communication via any suitable wired or wireless general data networks, such as other types of Ethernet networks, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1200 via I/O interface 1230. A computer-readable storage medium may also include any volatile or non-volatile media such as RAM (e.g. SDRAM, DDR SDRAM, RDRAM, SRAM, etc.), ROM, etc., that may be included in some embodiments of computer system 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240.

In one embodiment, the relationship between control system 1260 and I/O devices 1250 may be a server/client type of relationship. For example, control system 1260 may be configured as a server computer system 1200 that may convey instructions to and receive acknowledgements from I/O devices 1250. In such an embodiment, I/O devices 1250 may be relatively simple or "thin" client devices. For example, I/O devices 1250 may be configured as dumb terminals with display, data entry and communications capabilities, but otherwise little computational functionality. However, in some embodiments, I/O devices 1250 may be computer systems configured similarly to computer system 1200, including one or more processors 1210 and various other devices (though in some embodiments, a computer system 1200 implementing an I/O device 1250 may have somewhat different devices, or different classes of devices, compared to a computer system 1200 implementing control system 100). It is further contemplated that in some embodiments, the functionality of control system 100 may be distributed across some or all of I/O devices 1250. That is, in some embodiments, there may be no centralized point of control of the activity of order fulfillment center agents; rather, I/O devices 1250 may function in a cooperative, distributed fashion to coordinate the activities of the order fulfillment facility.

In various embodiments, I/O devices 1250 (e.g., a laser and image-enabled devices and other communication devices) may include, but are not limited to, one or more of: handheld devices, devices worn by or attached to the agents, and devices integrated into or mounted on any mobile or fixed equipment of the order fulfillment facility such as pushcarts, bins, totes, racks, shelves, tables, ceilings, walls, and work benches, according to various embodiments. I/O devices 1250 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with control system 1260. In general, an I/O device 1250 may be any device that can communicate with control system 1260 and convey instructions to agents within the facility. In one embodiment, at least some of the I/O devices 1250 may be configured to scan or otherwise read or receive codes or identifiers of various components in the order fulfillment facility and to communicate the entered codes to control system 1260 for use in directing agents in the various operations of the control center (e.g., bar code scanners, RFID readers, cameras, or any other sensing devices). Such components may include, but are not limited to, one or more of items, orders, modular sorting stations, modular bins, and compartments of modular bins.

In one embodiment, as least some of the I/O devices 1250 (e.g., a laser and image-enabled devices and other communication devices) may be configured as laser-based devices and/or light-based devices, having the functionality described herein. More specifically, laser and image-enabled devices, as described herein, may include devices employing vector-based laser technology (e.g., those having one horizontal and one vertical oscillating mirror), or raster-based laser technology (including MEMS technology and/or other techniques that include one mirror for each color), or any other suitable laser technology. In some embodiments, an a laser and image-enabled system may include one or more fixed-location, portable, or embedded projection display devices, or one or more wearable projection display devices, that utilize laser-based and/or light-based projection technology.

The various methods as illustrated in the figures and described herein represent exemplary embodiments of methods. The methods may be implemented manually, in software, in hardware, or in a combination thereof. The order of any method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A system, comprising:
a fulfillment center with a plurality of storage bins;
one or more computing devices configured to implement a control system configured to:
select an item to be picked based on an order for the item and select an identified storage bin storing a particular unit of the item among a plurality of units of heterogeneous items also stowed together in the identified storage bin;
obtain one or more images of the identified storage bin;
analyze the one or more images of the identified storage bin to determine a position of the unit of the item among the plurality of units of heterogeneous items also stowed in the identified storage bin, wherein to perform said analyze the control system is further configured to process at least one of the one or more images of the identified storage bin in real-time with a picking process for the unit of the item, wherein the one or more images of the identified storage bin that are processed in real-time are captured during the pick process for the unit of the item, before the unit of the item is picked;
send one or more position instructions to direct a laser-enabled device to point the laser at the determined position of the unit of the item; and
send one or more pick instructions to a laser-enabled device, wherein the one or more pick instructions direct an agent or direct a mobile inventory location containing the identified storage bin to a particular location and direct the agent to pick a unit of the item from the identified storage bin at the particular location;
the laser-enabled device configured to:
receive the one or more position instructions from the control system; and
illuminate with a laser the determined position of the unit of the item within the identified storage bin; and
wherein the control system is further configured to:
obtain a current position that the laser is actually illuminating from one or more real-time images of the identified storage bin, wherein the one or more real-time images capture a current position of the laser illumination in real-time with the picking process of the unit of the item; and
instruct adjustment of a direction that the laser is pointed, wherein said adjustment is based on feedback determined from comparing the current position the laser is actually illuminating with the determined position the laser is intended to be illuminating, wherein adjusting the direction the laser is pointed maintains illumination of the intended position when the laser-enabled device projecting the laser is moved, or corrects a position of the illumination when the current position is not the same as the intended position.

2. The system of claim 1, wherein to analyze the one or more images of the storage bin to determine a position, the control system is further configured to pre-process at least one of the one or more images of the identified storage bin before sending said one or more location-based pick instructions to the device, wherein to pre-process the at least one image the control system is configured to compare an identifying image of the item to the at least one image of the identified storage bin to determine the position of the unit of the item in the identified storage bin, wherein the at least one image is a most recent image of the identified storage bin.

3. A method, comprising:
performing, by one or more computing devices having one or more processors:
receiving a before image of a respective inventory location before a respective unit of the same item is stowed to or picked from the respective inventory location, wherein the respective inventory location is the inventory location or another inventory location;
receiving an after image of the respective inventory location after the respective unit of that item is stowed to or picked from the respective inventory location;
determining an identifying image of the item based on a comparison of the before image and the after image;
obtaining one or more images of an inventory location comprising a unit of an item, wherein the inventory location comprises a plurality of heterogeneous items that are stowed together in the inventory location;
analyzing the one or more images of the inventory location to determine a position of the unit of the item among the plurality of heterogeneous items stowed in the inventory location, wherein said analyzing comprises performing an image recognition technique based on the identifying image of the item to locate the item within the one or more images of the inventory location; and
instruct light-based illumination of the determined position of the unit of the item in the inventory location among the plurality of heterogeneous items stowed in the inventory location, such that the determined position that is illuminated distinguishes the unit of the item from other ones of the plurality of heterogeneous items in the inventory location.

4. The method of claim 3, wherein said analyzing the one or more images of the inventory location to determine the position further comprises:

pre-processing at least one of the one or more images of the inventory location before the unit of the item is selected for picking to fulfill an order for the item, wherein said pre-processing comprises comparing the identifying image of the item to the at least one image of the inventory location to determine the position of the unit of the item in the inventory location.

5. The method of claim 3, further comprising:
obtaining one or more other images of the inventory location comprising a unit of another item, wherein the inventory location comprises a plurality of heterogeneous items that are stowed together in the inventory location;
analyzing the one or more other images of the inventory location to determine a position of the unit of the other item among the plurality of heterogeneous items stowed in the inventory location; and
instructing light-based illumination of the determined position of the unit of the other item in the inventory location among the plurality of heterogeneous items, such that the position that is illuminated distinguishes the unit of the other item from other ones of the plurality of heterogeneous items in the inventory location and is different from the position that was illuminated for the unit of the item.

6. The method of claim 3, wherein said analyzing the one or more images of the inventory location to determine a position further comprises:
processing at least one of the one or more images of the inventory location in real-time with a picking process for the item, wherein the at least one image of the inventory location is captured during the picking process for the item, before the unit of the item is picked.

7. The method of claim 6, further comprising:
obtaining a current position illuminated by the light-based illumination from real-time imagery of the light-based illumination when the light-based illumination is illuminating the current position; and
adjusting a direction that the light-based illumination is pointed, wherein said adjusting is based on feedback determined from comparing the current position the light-based illumination is illuminating with the determined position the light-based illumination is intended to be illuminating, wherein said adjusting the direction the light-based illumination is pointed maintains illumination of the intended position when a device projecting the light-based illumination is moved.

8. The method of claim 3, wherein said illuminating, via light-based illumination, the determined position of the unit of the item in the inventory location comprises illuminating the determined position with a laser.

9. The method of claim 8, further comprising:
for a period of time, continuously analyzing imagery in an area surrounding a path of the laser, wherein analyzing imagery surrounding the path of the laser comprises analyzing the imagery to recognize one or more facial feature in the imagery;
discontinuing projection of the laser when the one or more facial features are recognized in the imagery.

10. A non-transitory computer-readable medium storing program instructions that when executed by a computer perform:
obtaining one or more images of an inventory location for a unit of an item, wherein the inventory location comprises a plurality of heterogeneous items that are stowed together in the inventory location;
analyzing the one or more images of the inventory location to determine a position for the unit of the item among the plurality of heterogeneous items stowed in the inventory location, wherein the inventory location comprises one or more graphical indicators associated with one or more known dimensions that are captured in the one or more images;
determining a ratio between the one or more known dimensions and one or more dimensions represented in the one or more images of the inventory location based on the one or more graphical indicators captured in the one or more images;
determining a reference position of the unit of the item represented in the one or more images of the inventory location with respect to the one or more graphical indicators; and
generating, based at least in part on the ratio and the reference position, instructions for illuminating, via light-based illumination, the determined position for the unit of the item in the inventory location.

11. The non-transitory computer-readable medium of claim 10, wherein said analyzing the one or more images of the inventory location to determine a position further comprises:
pre-processing at least one of the one or more images of the inventory location before the unit of the item is selected for picking to fulfill an order for the item, wherein said pre-processing comprises comparing an identifying image of the item to the at least one image of the inventory location to determine the position in the inventory location.

12. The non-transitory computer-readable medium of claim 10, wherein the program instructions are further executable to perform:
processing at least one of the one or more images of the inventory location in real-time with a picking process for the item, wherein the at least one image is captured during the picking process for the item, before the unit of the item is picked.

13. The non-transitory computer-readable medium of claim 12, wherein the program instructions are further executable to perform, prior to said illuminating, via light-based illumination, the determined position of the unit of the item in the inventory location:
projecting the light-based illumination into a field of view captured by a real-time image of the inventory location that is captured in real-time with the picking process;
adjusting a direction of the light-based illumination, wherein said adjusting is based on feedback determined from comparing a current position illuminated by the light-based illumination with the determined position the light-based illumination is intended to be illuminating, wherein said adjusting brings the light-based illumination upon the determined position.

14. The non-transitory computer-readable medium of claim 10, wherein the program instructions are further executable to perform sending the generated instructions for illuminating the determined position to a laser-enabled device configured to illuminate the determined position with a laser in response to receiving the instructions.

15. The non-transitory computer-readable medium of claim 14, wherein the program instructions are further executable to perform:
analyzing one or more images of a path of the laser to recognize one or more facial features in the one or more images of the path of the laser; and generating instructions to discontinue projection of the laser based on recognizing the one or more facial features in the one or more images of the path of the laser.

16. A system, comprising:

a laser-enabled device; and one or more computing devices configured to implement a control system configured to:

obtain one or more images of an inventory location for a unit of an item, wherein the inventory location comprises a plurality of heterogeneous items that are stowed together in the inventory location; and analyze the one or more images of the inventory location to determine a position for the unit of the item among the plurality of heterogeneous items stowed in the inventory location;

for a period of time, continuously analyze imagery in an area surrounding a path of a laser of the laser-enabled device, wherein continuously analyze imagery comprises analyze the imagery to recognize one or more facial features in the imagery; and instruct the laser-enabled device to discontinue projection of a respective laser when the one or more facial features are recognized in the imagery;

wherein the laser-enabled device is configured to discontinue projection of a laser in response to receipt of the instruction to discontinue projection of the laser.

\* \* \* \* \*